United States Patent [19]
Banks et al.

[11] Patent Number: 5,664,311
[45] Date of Patent: Sep. 9, 1997

[54] AUTOMATED SPAR ASSEMBY TOOL

[75] Inventors: David P. Banks, Lake Stevens; James E. Brodhead, Everett; James N. Buttrick, Jr., Seattle; Paul E. Ffield, Marysville; Darrell D. Jones, Lynnwood; James C. Murphy, Mukilteo; John F. Richards, Woodinville; Melvin R. Wiseman, Orting, all of Wash.; John W. Schooff, Janesville, Wis.; Steven C. Van Swearingen, Arbroath, Scotland

[73] Assignee: The Boeing Co., Seattle, Wash.

[21] Appl. No.: 647,209

[22] Filed: May 9, 1996

Related U.S. Application Data

[63] Continuation of Ser. No. 949,177, Sep. 21, 1992, abandoned.

[51] Int. Cl.[6] .................... B23P 11/00; B23P 23/00; B23Q 39/02
[52] U.S. Cl. .................... 29/407.04; 29/33 K; 29/54; 29/56.6; 29/431; 29/433; 29/407.01; 29/407.05; 29/464; 29/468; 29/525.06; 29/559; 29/701; 29/809; 29/897.2
[58] Field of Search .................... 29/897.34, 407.05, 29/407.08, 407.04, 433, 431, 464, 467, 468, 559, 701, 26 A, 33 K, 50, 54, 55, 56.6, 525.06, 897.2, 407.01, 525.07, 809; 408/39–41, 88, 78; 221/2.11, DIG. 1, 69; 206/338

[56] References Cited

U.S. PATENT DOCUMENTS

| | | | |
|---|---|---|---|
| 1,946,808 | 2/1934 | Peirce | 206/338 X |
| 2,590,358 | 3/1952 | Williams | 206/338 |
| 3,254,794 | 6/1966 | Meresz et al. | 221/124 |
| 3,334,785 | 8/1967 | Grabowski et al. | 221/88 |
| 3,900,131 | 8/1975 | Ehrlich | 221/169 |
| 4,220,275 | 9/1980 | Hametner et al. | 227/5 |
| 4,392,300 | 7/1983 | Billman et al. | 29/739 |
| 4,473,935 | 10/1984 | Tatsuura et al. | 29/33 K X |
| 4,815,193 | 3/1989 | Gutnik | 29/509 |
| 4,821,408 | 4/1989 | Speller, Sr. et al. | 29/701 |
| 4,848,592 | 7/1989 | Shemeta | 221/211 |
| 4,894,903 | 1/1990 | Woods | 29/559 X |
| 5,033,174 | 7/1991 | Zieve | 29/33 K X |
| 5,142,764 | 9/1992 | Whiteside | 29/559 |
| 5,271,139 | 12/1993 | Sticht | 29/721 X |
| 5,283,943 | 2/1994 | Aguayo et al. | 29/720 X |

OTHER PUBLICATIONS

Article "Automation Comes to Airframes" Design News dated Sep. 21, 1992.

*Primary Examiner*—S. Thomas Hughes
*Attorney, Agent, or Firm*—Lawrence W. Nelson

[57] ABSTRACT

An automated assembly machine for fabricating large mechanical structures including a floor assembly jig for receiving and holding parts in a desired orientation, a pair of carriages, a first drive mechanism for independently driving the carriages longitudinally, a second drive mechanism for moving the carriages vertically, a tool tray mounted on the carriages, and a plurality of tools, including a drill, a hole diameter measurement probe, a nut runner, and an electromagnetic riveter, mounted on the tool tray for lateral movement toward and away from a workpiece clamp-up position. The tools are positioned at the workpiece clamp-up position by moving one of the carriages longitudinally along the floor assembly jig and raising the other carriage to elevate the tool tray to a desired elevation.

24 Claims, 21 Drawing Sheets

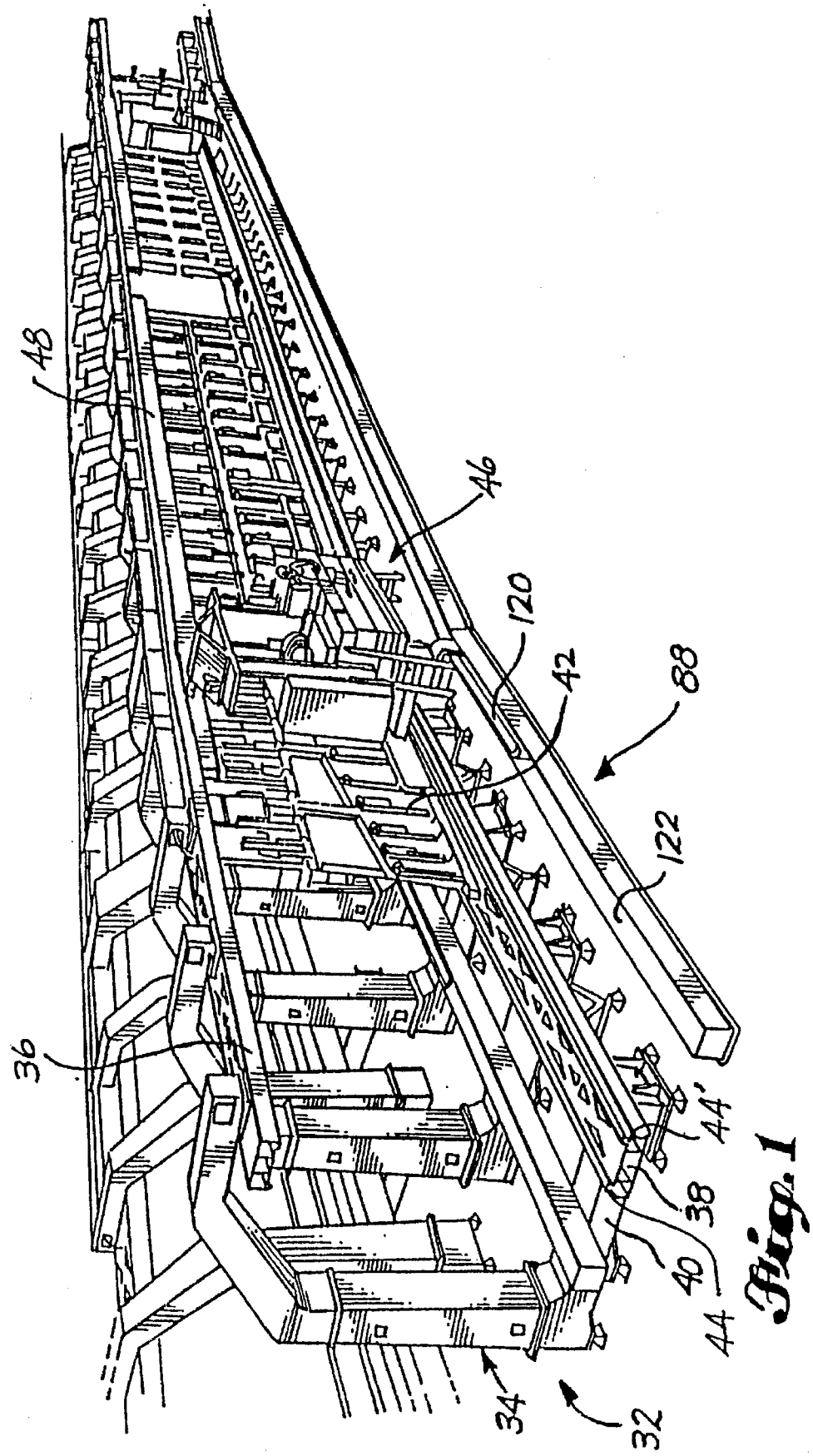

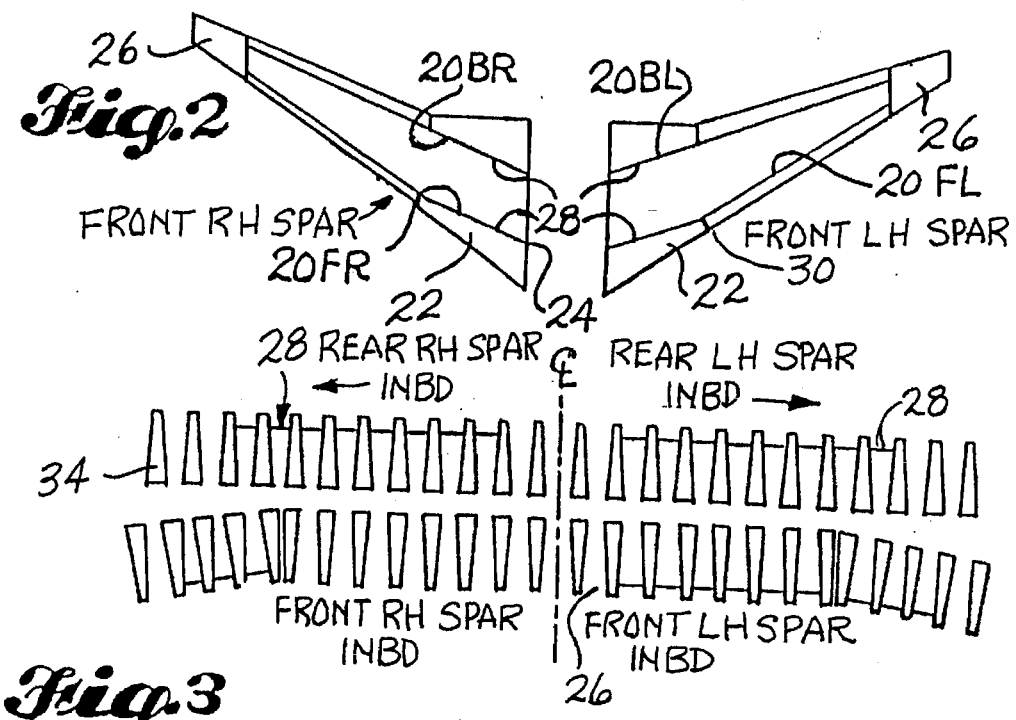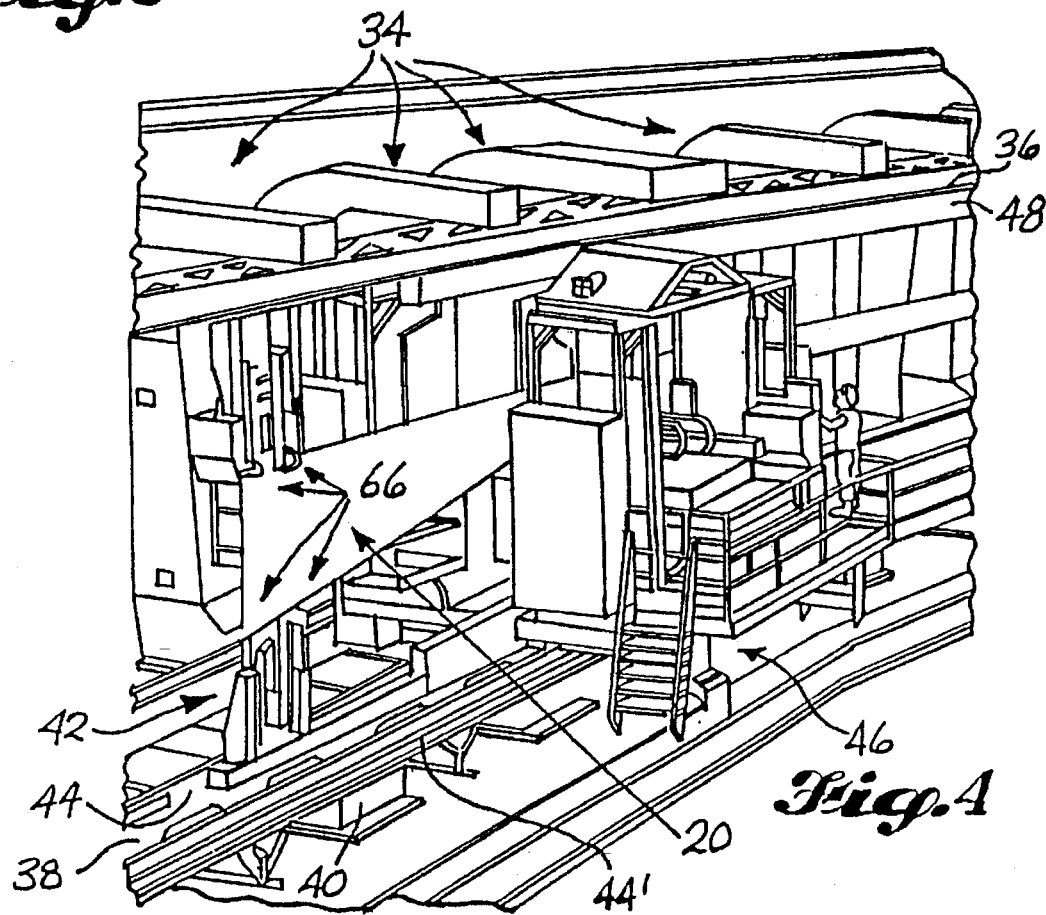

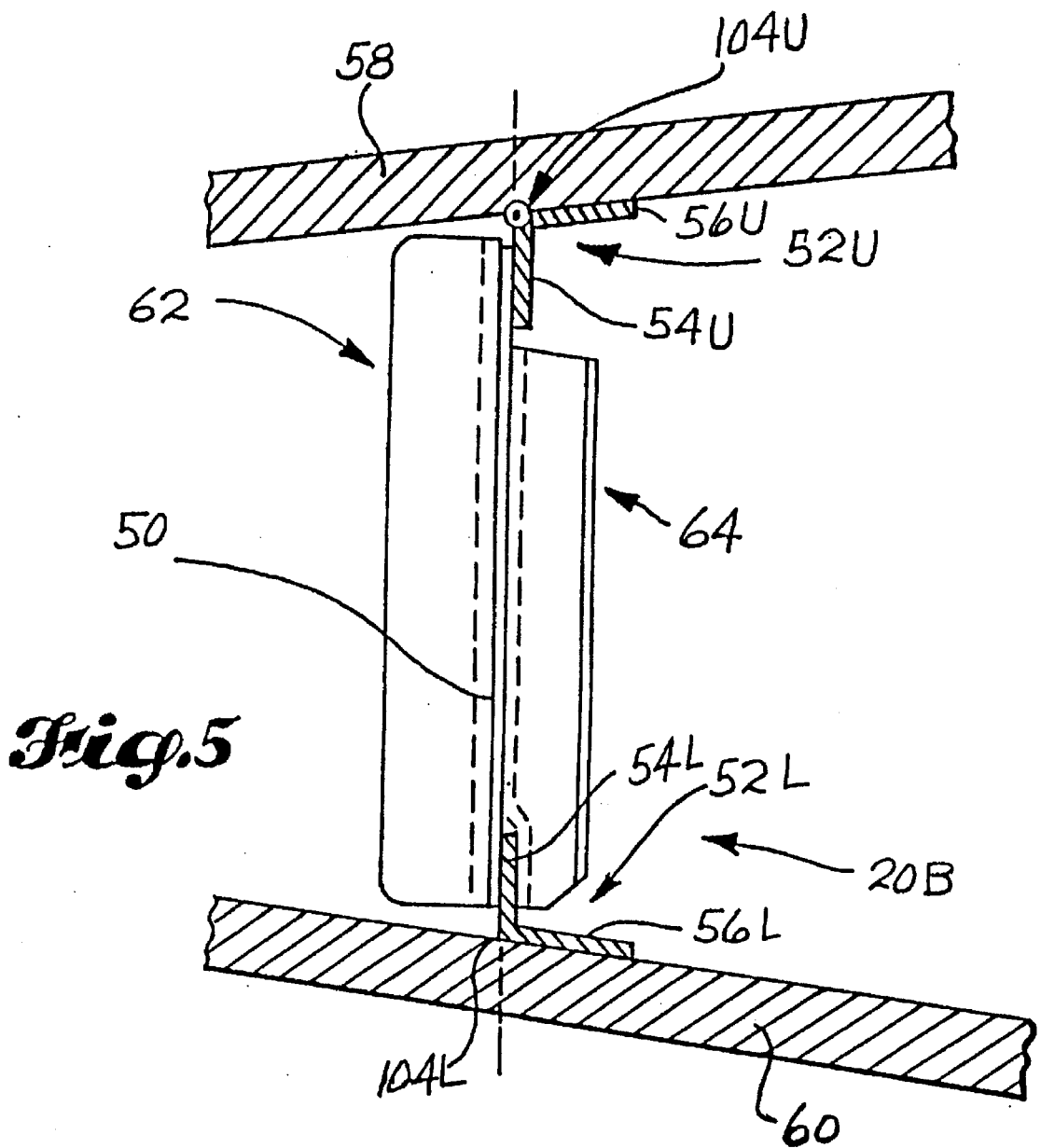

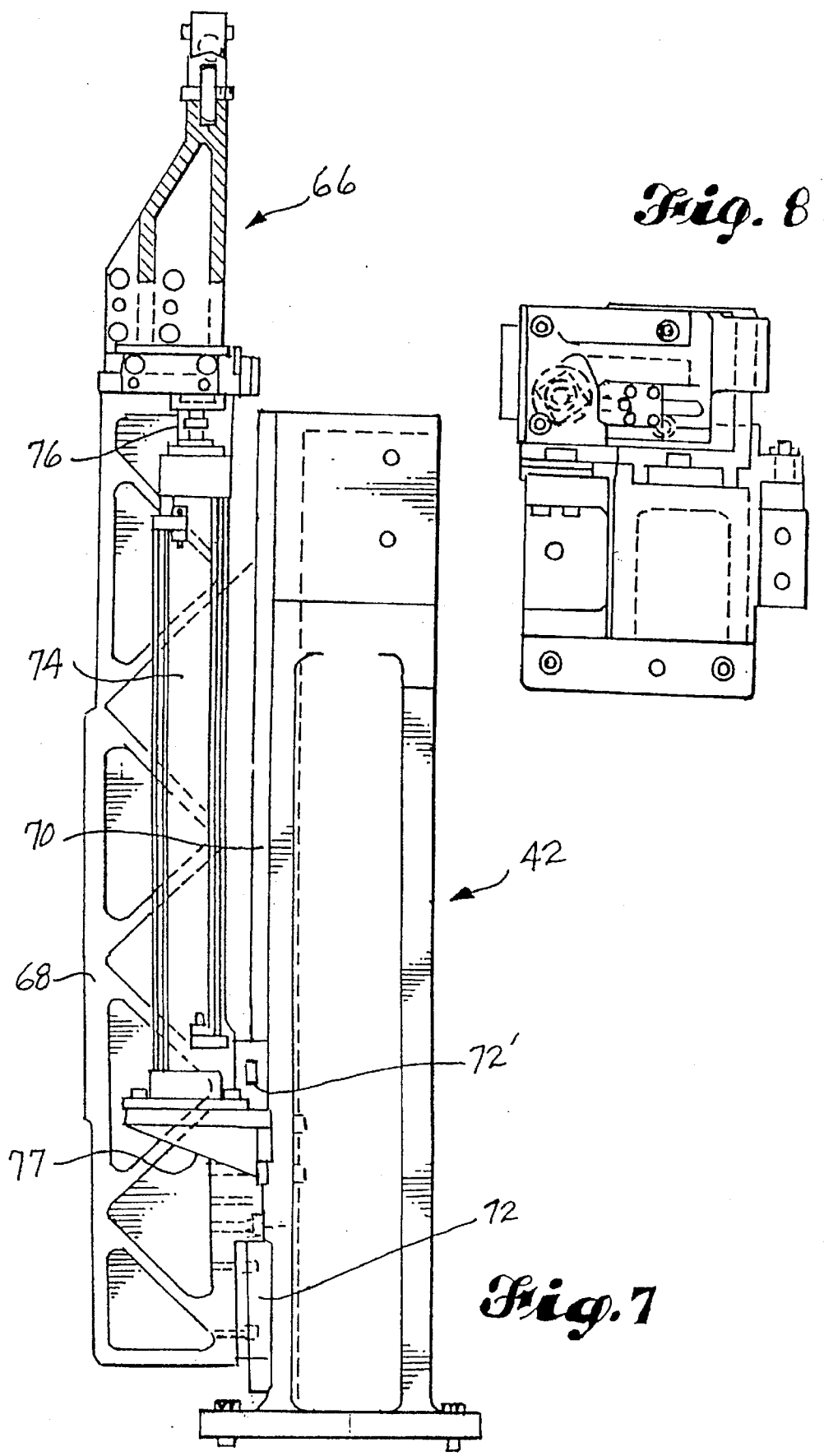

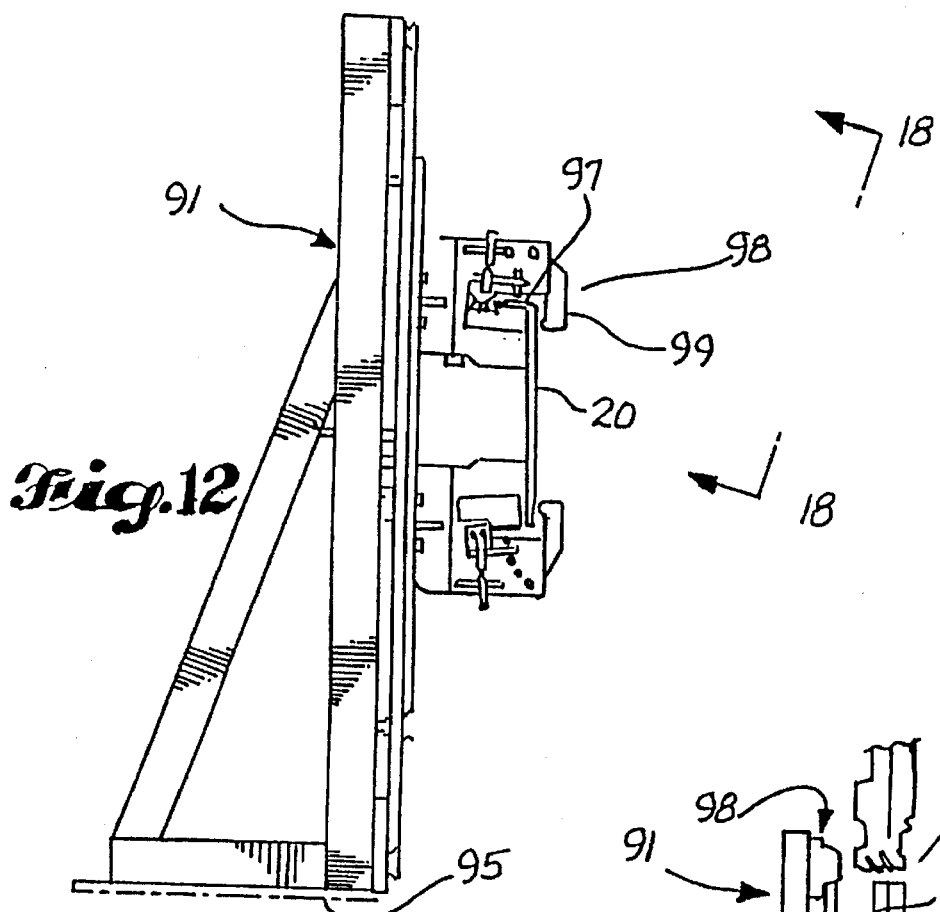
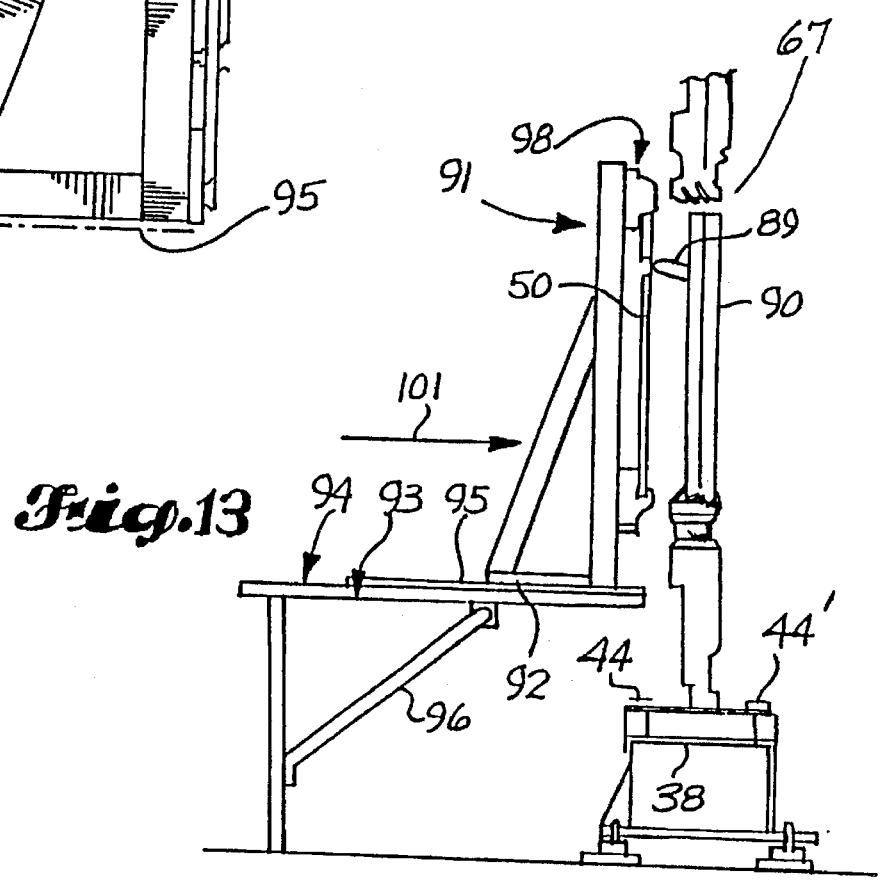

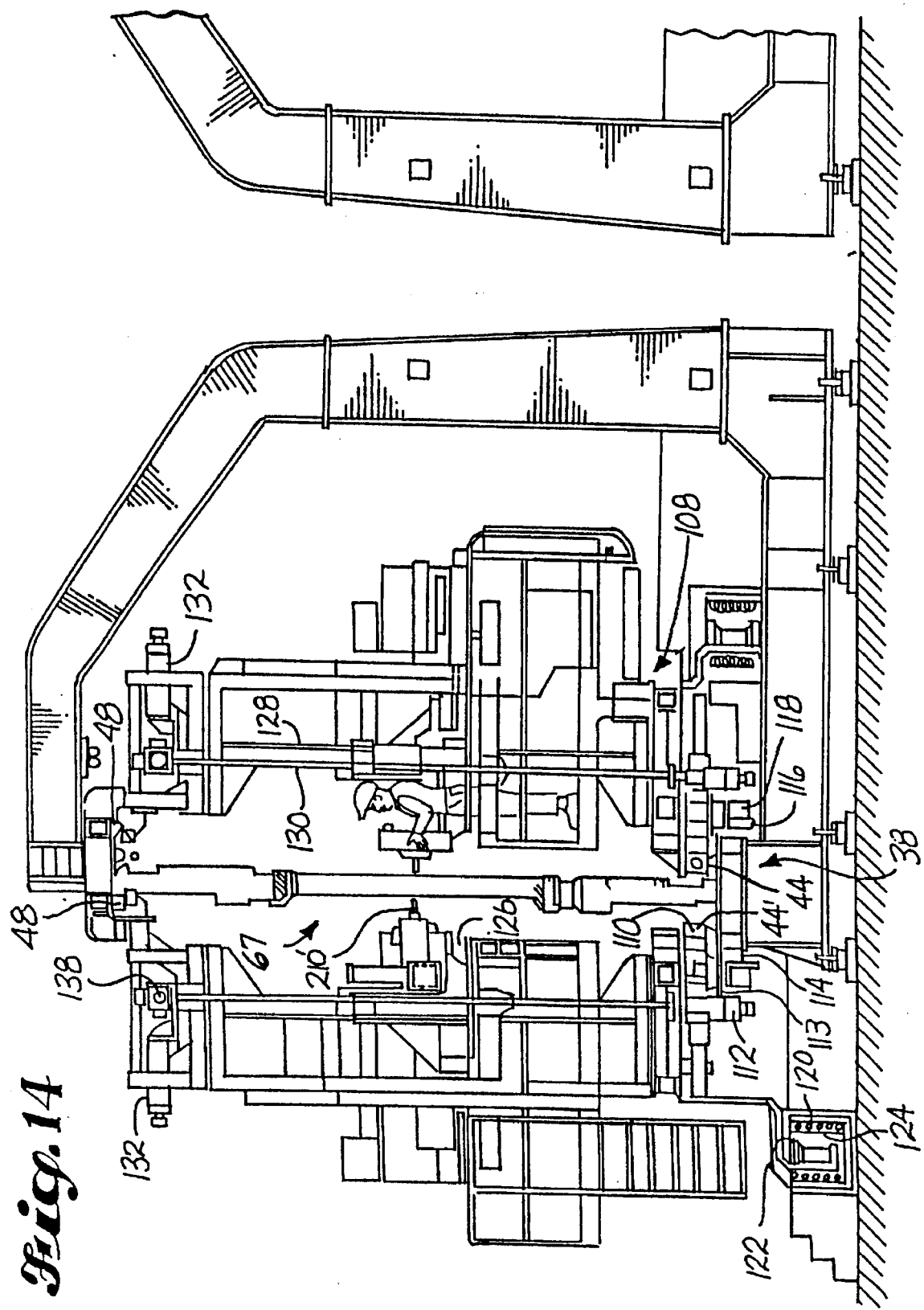

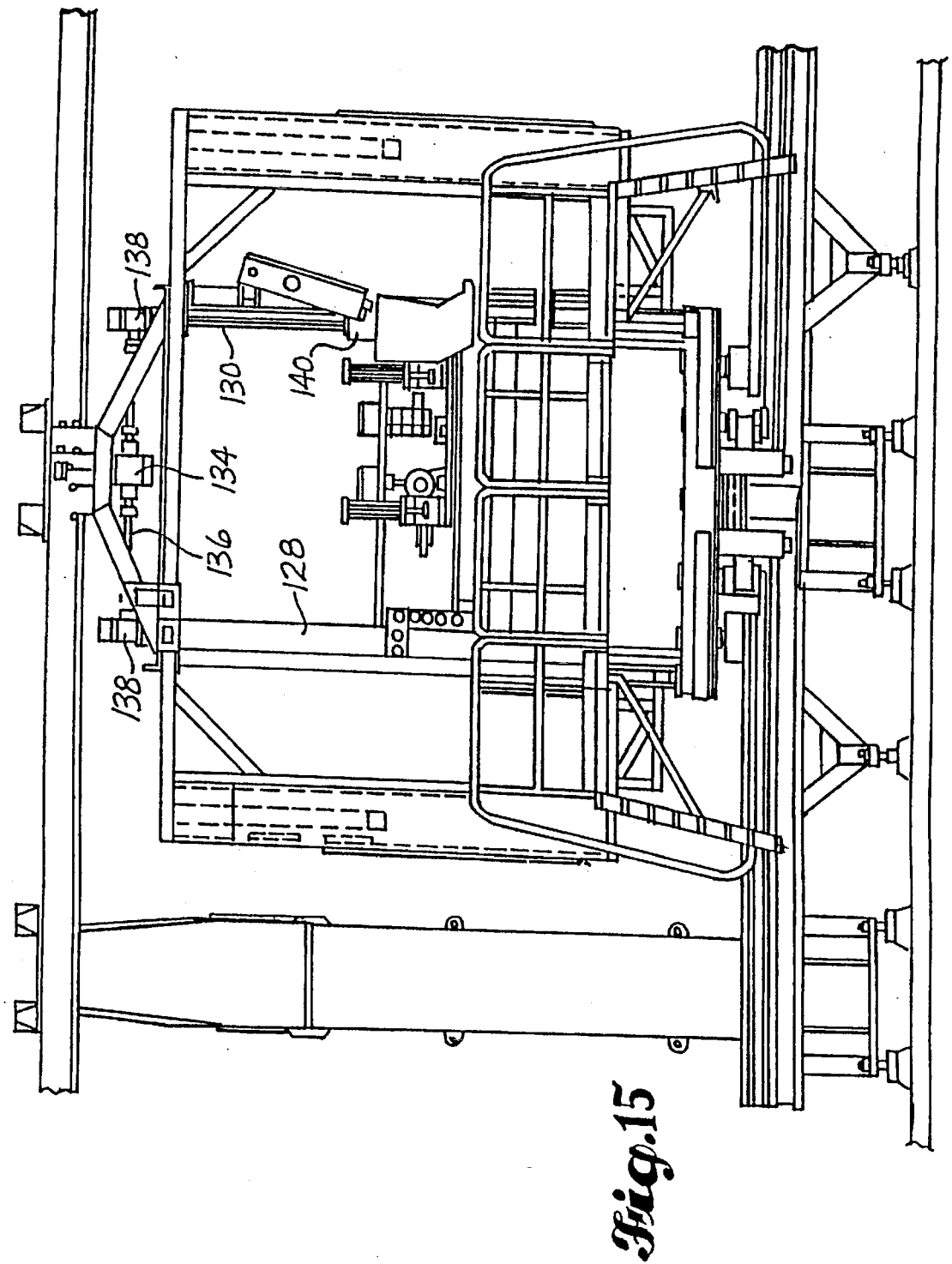

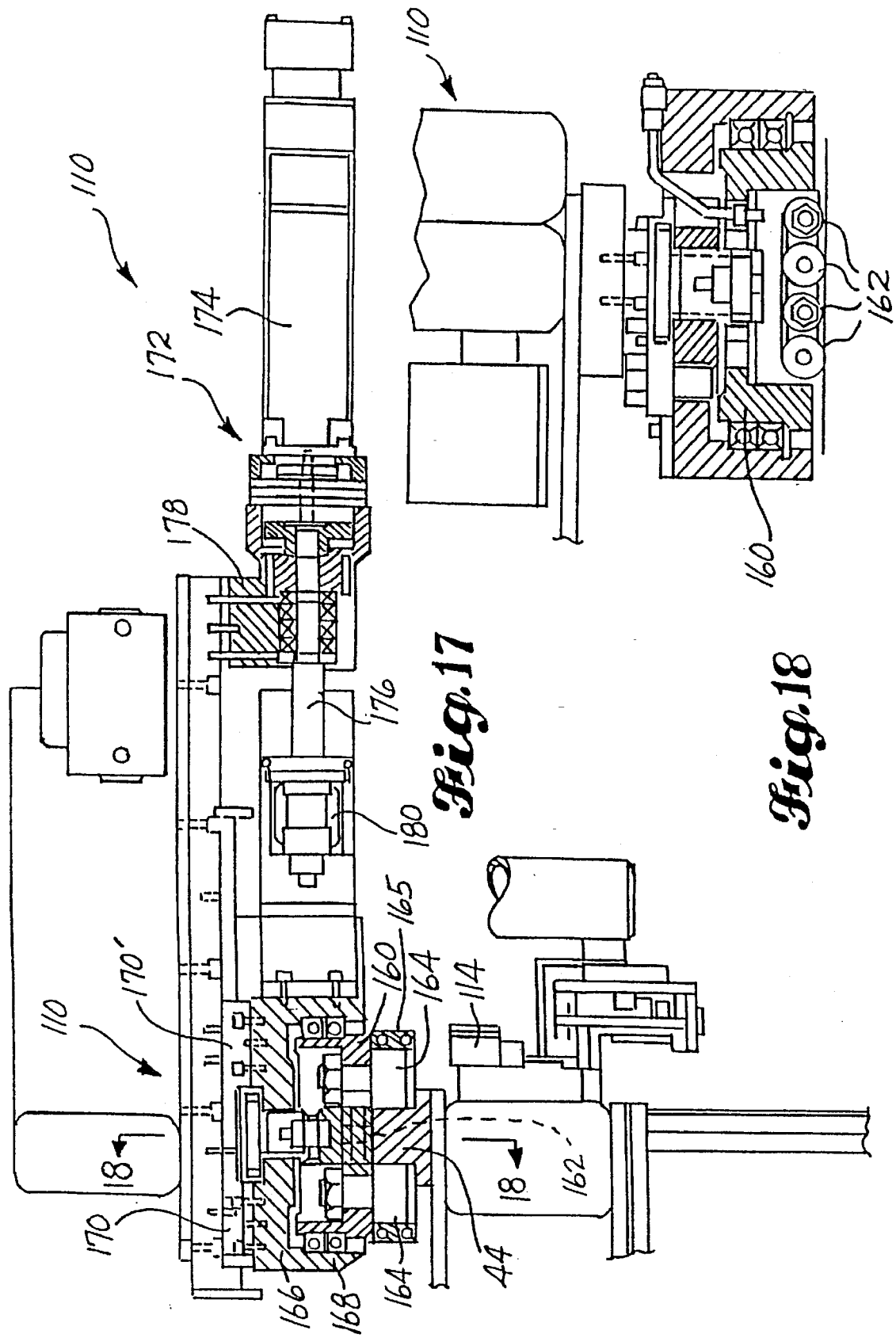

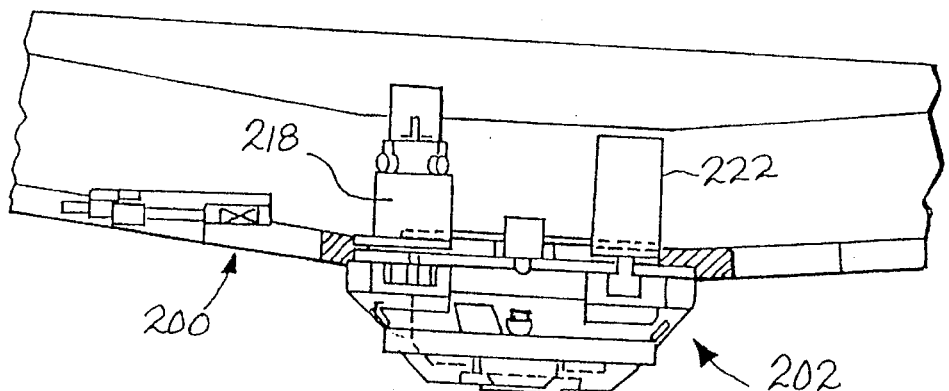
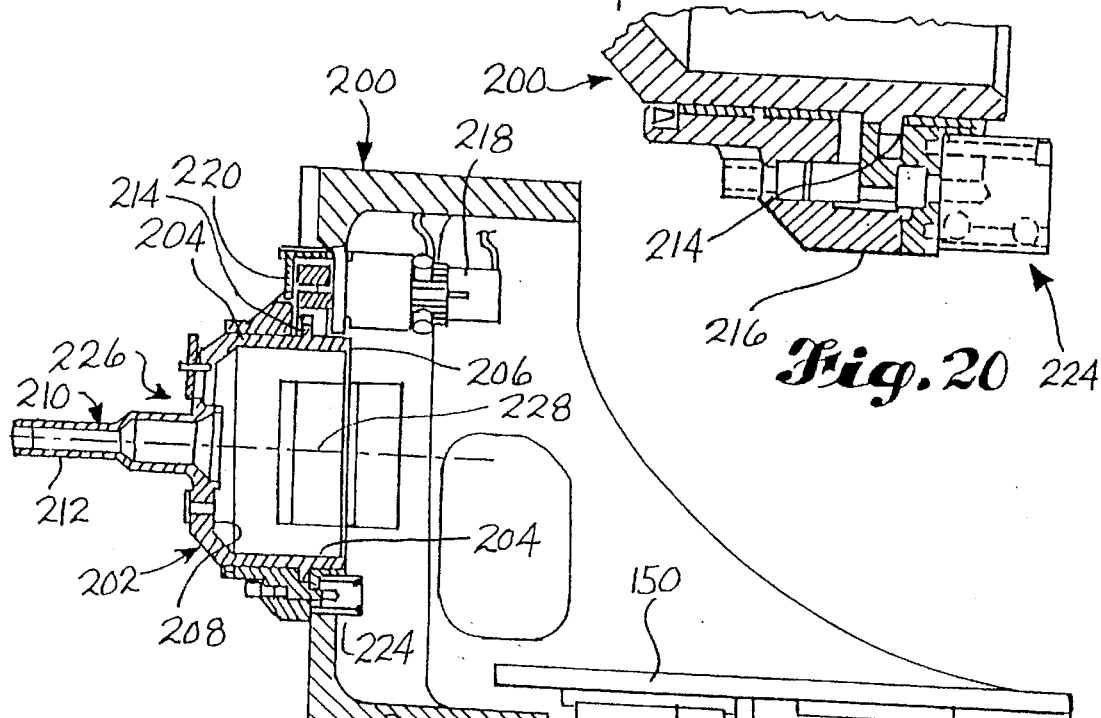

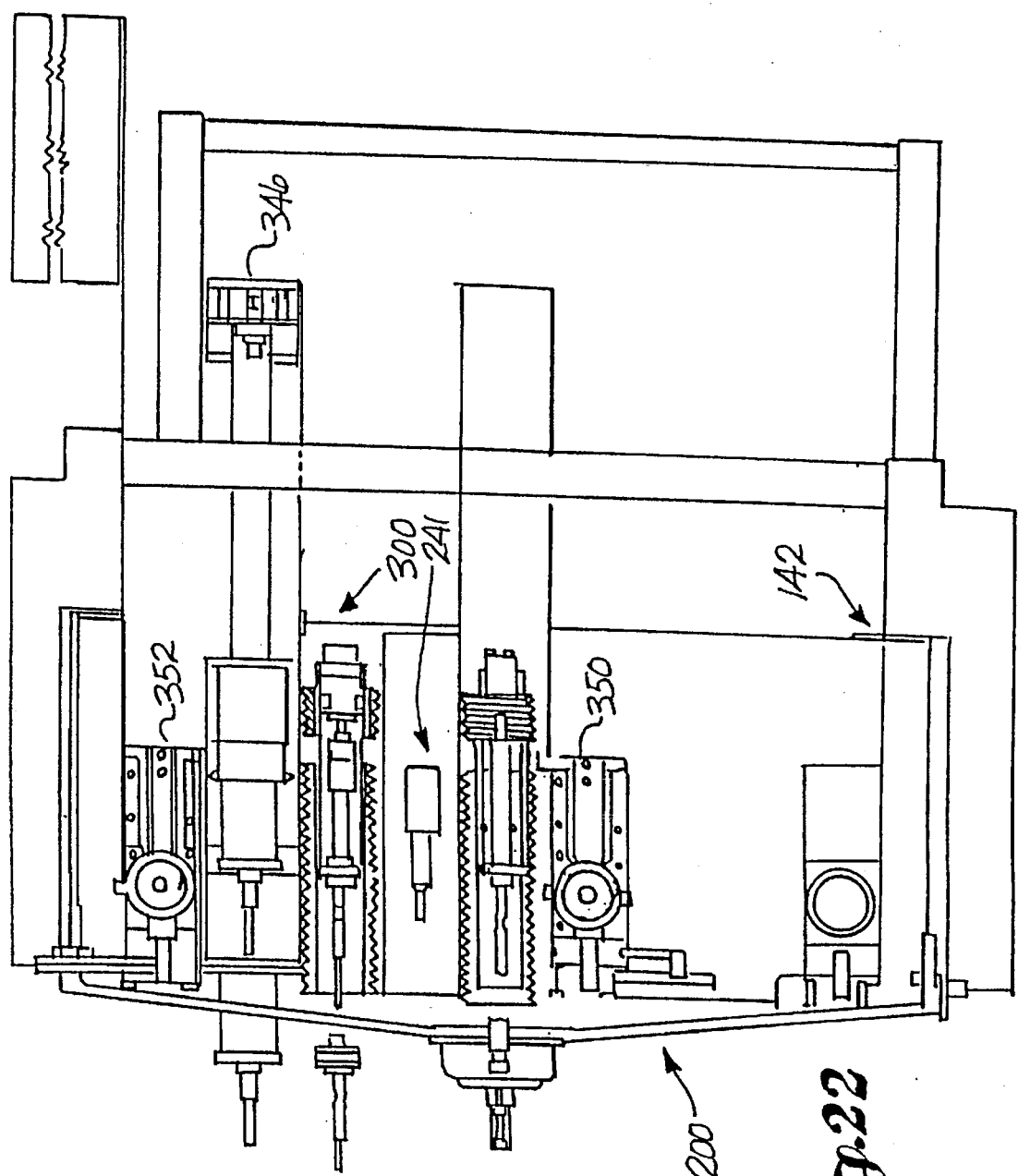

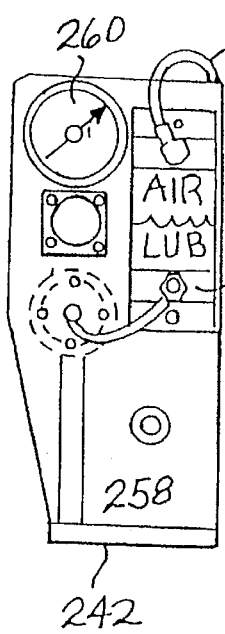
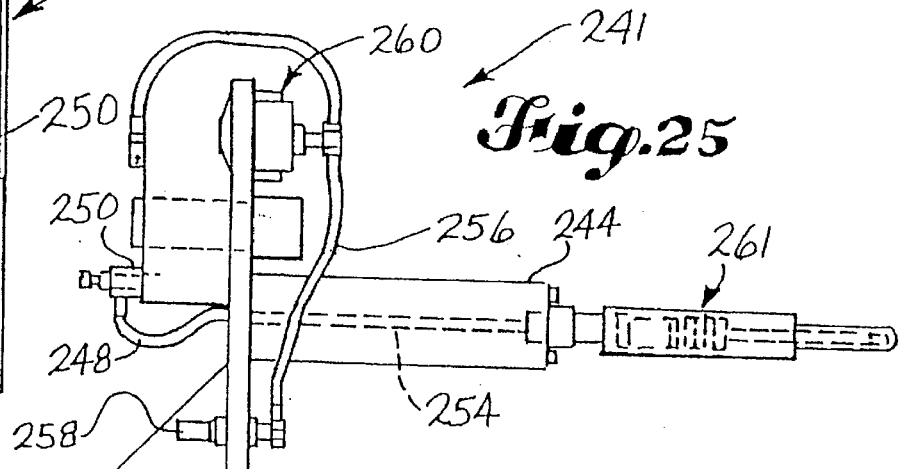
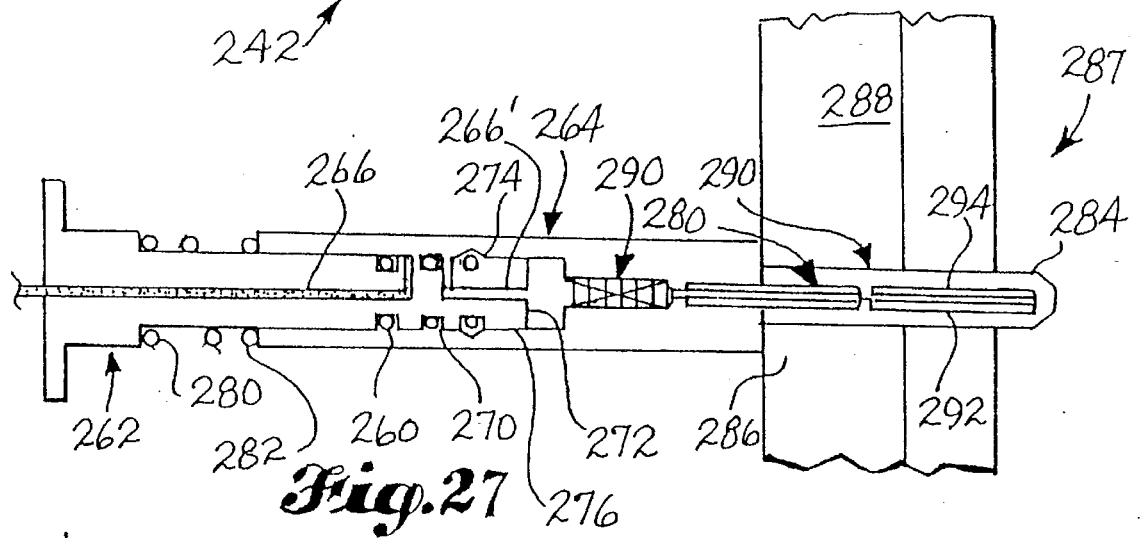
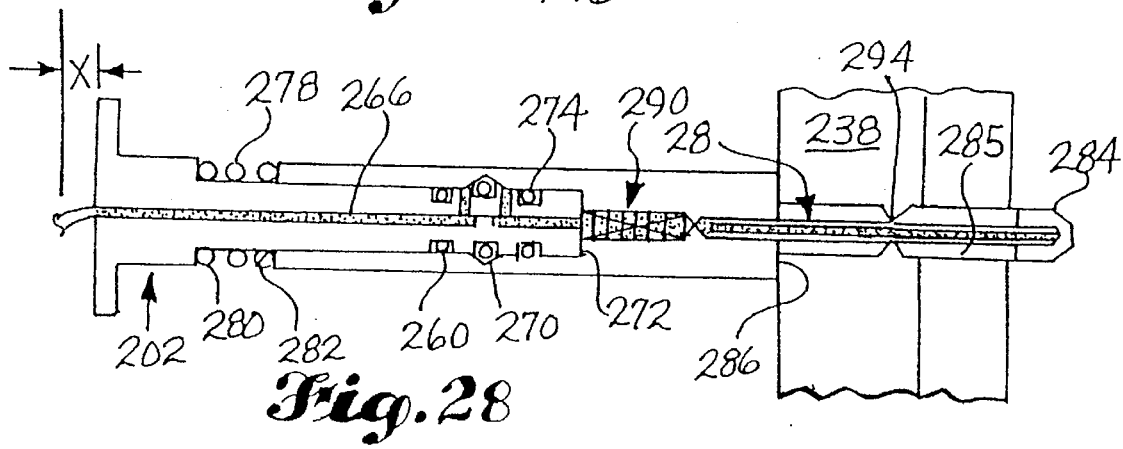

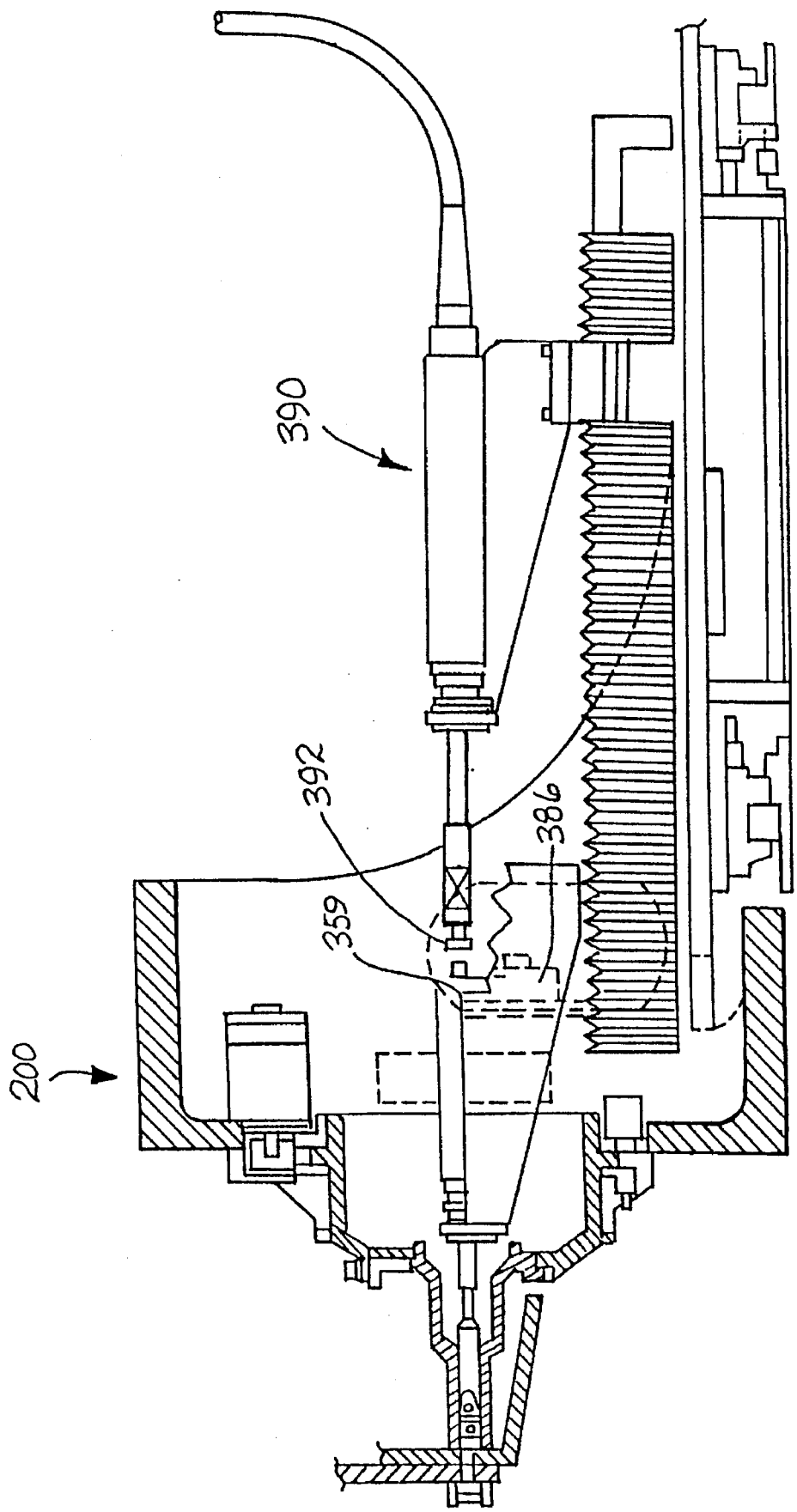

AUTOMATED SPAR ASSEMBY TOOL

This application is a continuation of prior application Ser. No. 07/949,177, filed Sep. 21, 1992, now abandoned.

This invention relates to automated assembly equipment, and more particularly to an automated airplane wing spar assembly tool for clamping the parts of the spar in the correct position, and performing various machining and fastener installation operations, such as: drilling fastener holes in the assembled parts of the spar, cold working and reaming the holes and checking for dimensional conformance with the specification, inserting bolts and threading nuts on the bolts and torquing the nuts to the proper torque, inserting lock bolts in the holes and installing collars on the lock bolts and swaging the collars on the lock bolts with the proper tension in the lock bolt, and installing rivets in holes and upsetting the rivets.

BACKGROUND OF THE INVENTION

Large structural components which are part of larger structures and which must be fabricated to close dimensional tolerances are typically assembled on hard tooling and fastened together by hand. This entails high labor costs and continual calibration and maintenance of the fixturing tooling, which can experience very hard usage in the factory. An example of such a structure is an airplane wing spar, which is a structural component of an airplane wing that couples the upper and lower wing skin and provides stiffness to the wing. Each wing has a forward and a rear spar, each bent to accommodate the swept configuration of the wing. As a consequence, there are four unique spars on each airplane, each of which would normally require its own tooling and associated periodic calibration and maintenance.

The cost of manual assembly of large mechanical structures can be considerable, especially when the structure must be built to very close dimensional tolerances. The assembly procedure requires highly skilled labor and often requires rework when stringent quality requirements, such as exist in the airframe industry are not met by some rivet or other fastener. Moreover, the hand assembled structures require long assembly times which can increase the number of tooling sets required when high volumn production is needed.

The parts to be assembled to make the structure should be easily loaded onto the assembly machine and be positionable thereon with great accuracy and speed. It is probably necessary to provide a fine adjustment on the machine to ensure that the parts are located thereon at the exactly correct position, within the required dimensional tolerances.

An automated assembly machine must perform all of the operations performed by the manual process, including all the routine ones such as rivet insertion and threading nuts on bolts. All these processes must be performed with speed and precision and must be repeatable for thousands of cycles without fault to avoid the need for time consuming operator intervention.

Flexibility is a desirable attribute of an automated assembly machine. In the event that one of the machines requires service, it would be a valuable feature if one of the machines could be reconfigured temporarily, and quickly, to enable the assembly of the structure normally made on another machine on that machine, thereby maintaining the necessary flow of completed structures to the factory.

SUMMARY OF THE INVENTION

Accordingly, it is an object of the invention to provide an automatic assembly machine for large mechanical structures that can quickly and accurately position and clamp the parts for the structure on the machine, and then perform the operations on the machine that are needed to fasten the parts together into a unitary structure in which all dimensions are reliably within tolerance.

These and other objects of the invention are attained in a machine having a floor assembly jig on which are mounted a multiplicity of clamps for receiving and holding the parts in a desired orientation with respect to each other and in a desired position in space, clamped together in a workpiece clamp-up position. The jig has supports and guides for supporting and guiding a pair of carriages along the length of the machine on opposite sides of the workpiece clamp-up position. The carriages are supported and guided on the supports and guides on opposite sides of the workpiece clamp-up position. A drive mechanism for each carriage independently drives the carriages longitudinally along said guides and supports. A special bearing and jacking arrangement enables the carriages to negotiate a bend in the floor assembly jig while maintaining the normality of the tool axis on the carriage with the plane of the workpiece.

A tray frame is mounted on each of the carriages for vertical movement relative to the carriage, and a second drive mechanism moves each of the tray frames vertically with respect to the carriage. Each tray frame includes a clamp nose that can me moved toward and away from the workpiece to clamp the workpiece between the clamp noses on the two tray frames while processing operations are carried out, such as drilling, riveting, etc. The two drive mechanisms enable the tray frame to be positioned accurately at any desired position along the surface of the workpiece for the processing operations.

A tool tray is mounted on a shifting mechanism on the tray frame for longitudinal movement on the frame relative to the tray frame and the clamp nose. The tool trays carry a plurality of tools, including a drill, a hole diameter measurement probe, a nut runner, and an electromagnetic riveter. The tools are mounted on slides on the tool tray for lateral movement toward and away from said workpiece clamp-up position. A motive device is provided for moving each of the tools toward and away from said workpiece clamp-up position. The tools can thus be positioned at any desired position along the surface of the workpiece by moving the carriages along the floor assembly jig to the desired longitudinal position, and raising the tray frame to elevate the tool tray to the desired elevation, and then shifting the tool tray longitudinally along the tray frame to align the tool with the clamp nose. The tool can then be slid through the hollow clamp nose to engage the workpiece. The tool tray can be moved as often as needed to engage the tools with the workpiece through the clamp nose without disengaging the clamp nose until all operations at that position are finished.

DESCRIPTION OF THE DRAWINGS

The invention, and its many attendant objects and advantages will become more apparent upon reading the description of the preferred embodiment in conjunction with the drawings, wherein:

FIG. 1 is a perspective view of an automated assembly machine in accordance with this invention;

FIG. 2 is a schematic plan view of a pair of airplane wings, showing the position of the wing spars therein;

FIG. 3 is a schematic plan view of the machine of FIG. 1, showing the layout of the FAJ sections for the several spars;

FIG. 4 is an enlarged perspective view of a portion of the FAJ and the carriage working on a spar held in the FAJ;

FIG. 5 is a cross section of an airplane wing showing a spar and portions of connected wing skins;

FIG. 7 is a side elevation of the structure shown in FIG. 6;

FIG. 8 is a plan view looking down on the structure shown in FIG. 6;

FIG. 12 is an elevation of a clamp and clamp bracket used for loading parts on the FAJ;

FIG. 13 is a schematic view of the lift door on which the structure of FIG. 6 is mounted;

FIG. 14 is an end elevation in the direction of the X-axis showing the FAJ and a pair of carriages working on a spar held in the FAJ;

FIG. 15 is a side elevation in the direction of the Z-axis showing a portion of the FAJ and one of the carriages;

FIG. 17 is a cross-sectional elevation in the direction of the X-axis of a bearing block and an attached jack screw;

FIG. 18 is a cross-sectional elevation along lines 18—18 in FIG. 12;

FIG. 19 is an end elevation of the headstone and rotating nose for clamping the parts while performing manufacturing operations on them;

FIG. 20 is an enlarged cross-sectional elevation of a portion of the structure shown in FIG. 19, showing the brake for the rotating nose;

FIG. 21 is a plan view of the structure shown in FIG. 19

FIG. 22 is an elevation of the wet side tray platform showing the head stone and the tool tray;

FIG. 25 is an end elevation of an automatic lubrication tool mounted on the tool tray in FIG. 22;

FIG. 26 is a side elevation of the lubrication tool shown in FIG. 25;

FIGS. 27 and 28 are end elevations of the lubricant applicator mounted on the lubrication tool of FIG. 25, shown in "off" and "on" positions in FIGS. 27 and 28, respectively;

FIG. 37 is an elevation of the nut runner mounted on the wet side tool tray shown in FIG. 22.

DESCRIPTION OF THE PREFERRED EMBODIMENT

Figure 6:
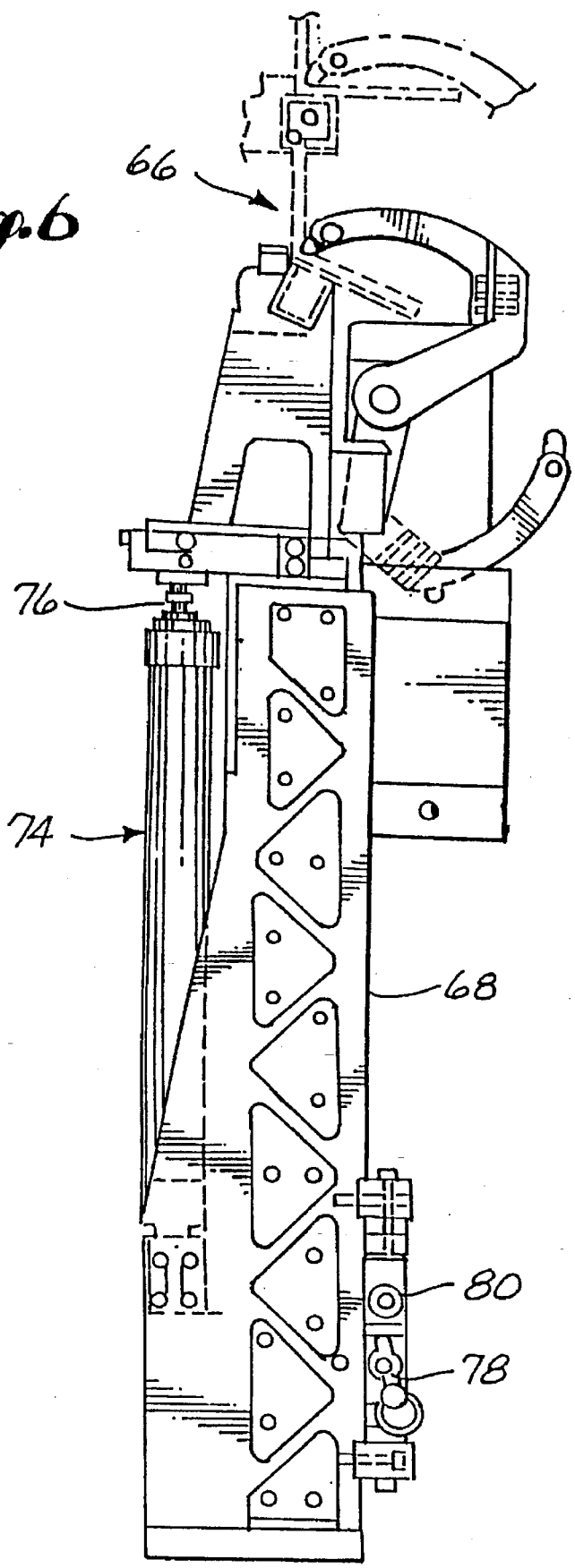
FIG. 6 is an end elevation of a clamp pillar supporting a clamp for holding the spar chords and web in position for fabrication into a spar.

Turning now to the drawings, wherein like numerals designate identical or corresponding parts, and more particularly to FIG. 1 thereof, an automated spar assembly machine is shown for producing wing spars for large transport airplanes. Although the invention can be used for producing many different types of large mechanical structures, the spar assembly machine will be described for purposes of illustration. For this purpose, a brief description of airplane wing spars will be useful to understand the machine.

As shown in FIG. 2, an airplane wing normally has two spars, a front spar and a rear spar. The spars are not symmetrical about their horizontal centerlines, so the right and left wings each have a unique front and rear spar. Each spar has a bend 22 approximately one third from the root end 24, and each spar tapers in height from the root end 24 to the outboard end 26. Each spar has a "wet side" and a "dry side" referring to the fact that fuel is carried in the wings and the inside surfaces (the "wet side") of the spars comprise part of the fuel tanks.

The spar assembly machine of this invention includes a floor assembly jig 32 (commonly referred to as an FAJ) having one section for each spar. The four sections of the FAJ 32 are arranged as shown in the schematic of FIG. 3 and are each substantially identical except for the angle of the bend 22 and the position of the clamps, as will be described below. The FAJ 32 includes a series of floor-mounted C-frames 34 which carry a top track 36 at their top ends, and a bottom track 38 on a floor-mounted base section 40 of the C-frames. A multiplicity of clamp support pillars 42 are mounted centrally on the bottom track 38 and the top track 36, extending vertically toward each other and defining between them a workpiece clamp-up position. The clamp support pillars 42 extend in line axially along each section of the FAJ 32 for almost its full length. A pair of carriage support and guide rails 44 and 44' is mounted on the bottom track 38 on both sides of the line of clamp support pillars 42 and extend parallel to each other the full length of the FAJ 32.

A carriage 46, shown in FIGS. 4 and 14, is supported vertically on each of the rails 44, and is supported laterally at the top of the carriage by one of two top rails 48 secured to the top track 36, one for each carriage. Each of the four sections of the FAJ, one for each spar, has a pair of carriages 46, but they are so similar that only one pair of carriages 46 will be described. The two pairs of carriages for the front or rear spar can be moved along the track from the right or left hand FAJ to both operate on a single spar 20 from opposite ends while parts are being installed on the other hand FAJ if needed.

A typical rear spar is shown in FIG. 5. It includes a web 50 an upper chord 52U, and a lower chord 52L. The upper chord 52U, has a vertical leg 54U and a "horizontal" leg 56; the lower chord 52L has a vertical leg 54L and a "horizontal" leg 56L. As illustrated in FIG. 5, the "horizontal" leg 56 is not exactly horizontal, that is, it makes an angle with the vertical leg that is slightly greater than 90°, because of the chord-wise curvature of the wing. On the upper chord 52U, the angle that the horizontal leg 56U makes with the vertical leg 54U is greater than the corresponding angle on the lower chord 52L because the curvature of the upper wing skin 58 is greater than that of the lower wing skin 60. A series of stiffeners 62 are fastened to the dry side of the spar 20B, and a series of rib posts 64 are fastened on the wet side of the spar for attachment of the wing ribs that extend between the front and rear spars.

As shown in FIGS. 6–11, the clamp support pillars 42 carry clamps 66 for clamping the chords 52 at the correct position to ensure that the vertical dimension of the spar 20 will be correct. The clamps 66 are each mounted on the distal end of a clamp post 68 which, as best shown in FIG. 7, is connected to a clamp support pillar 42 by a vertical slide having a track 70 mounted on the pillar 42 and a pair of spaced followers 72 and 72' mounted on the post 68. A set of recirculating linear bearings between the track 70 and the followers ensure that the post will slide smoothly on the pillar 42, and that the post will be supported on the pillar in a precisely vertical orientation.

Figure 9:
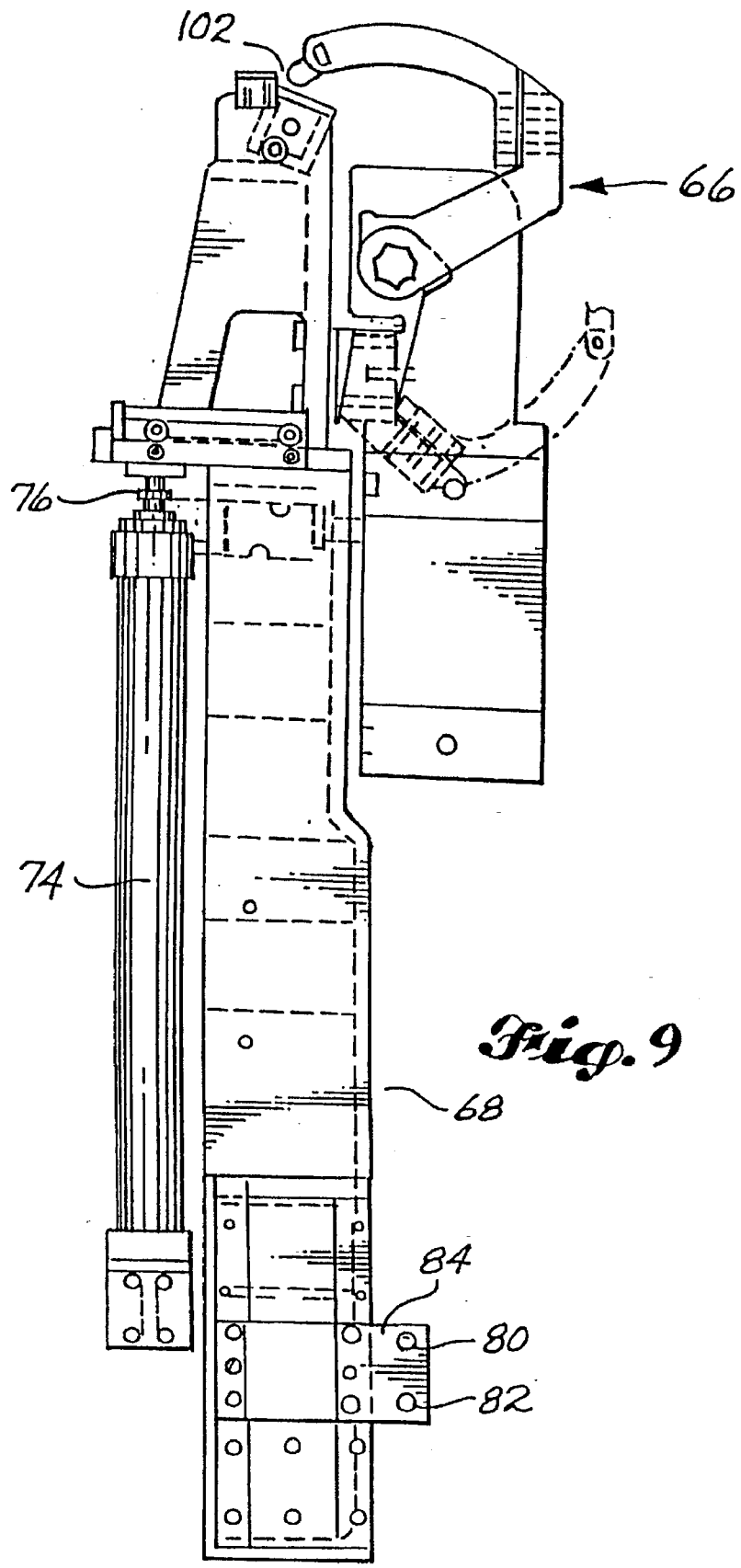
FIG. 9 is an enlarge end elevation of the structure shown in FIG. 6 with some parts broken away for clarity.
Figure 10:
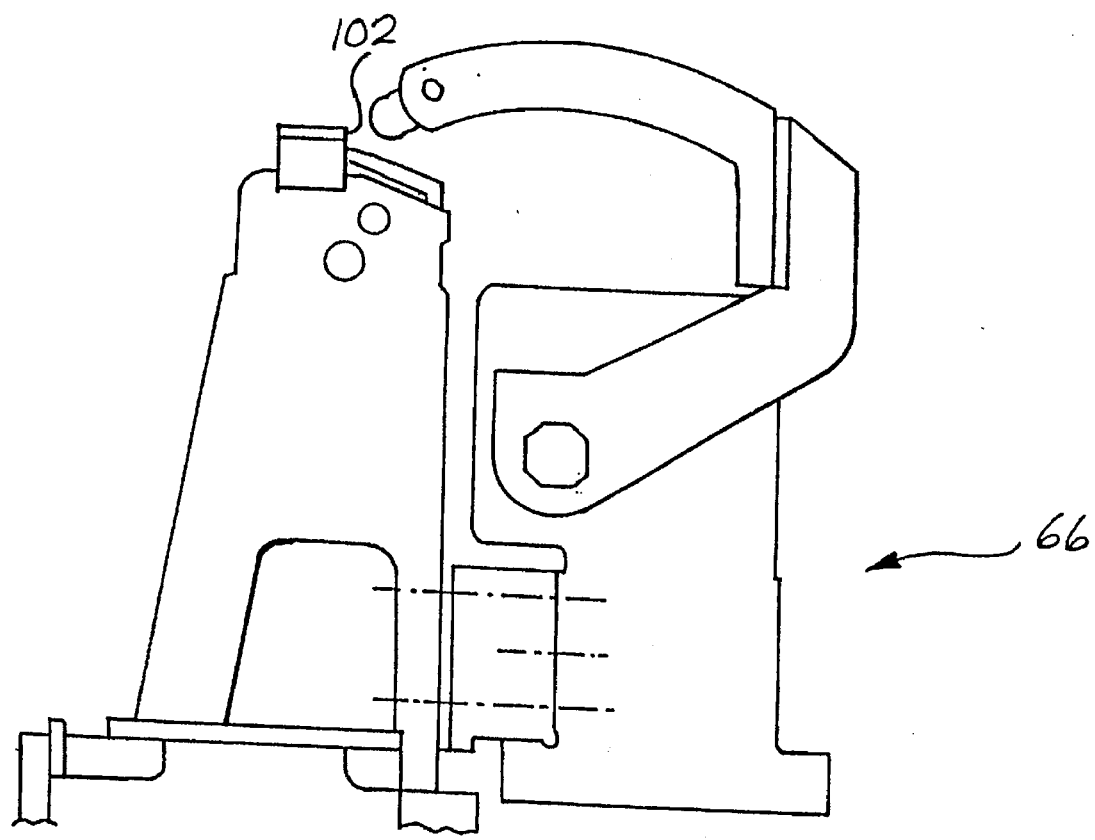
FIG. 10 is an enlarge end elevation of the clamp shown in FIG. 6.
Figure 11:
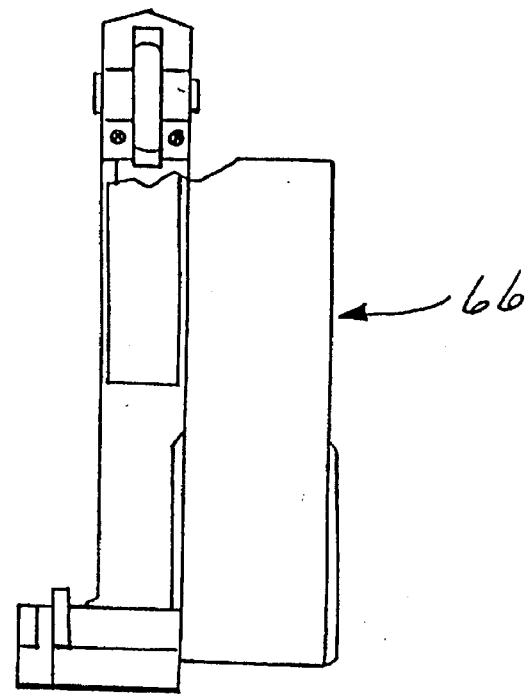
FIG. 11 is an enlarged side elevation of the clamp shown in FIG. 10.
Figure 16:
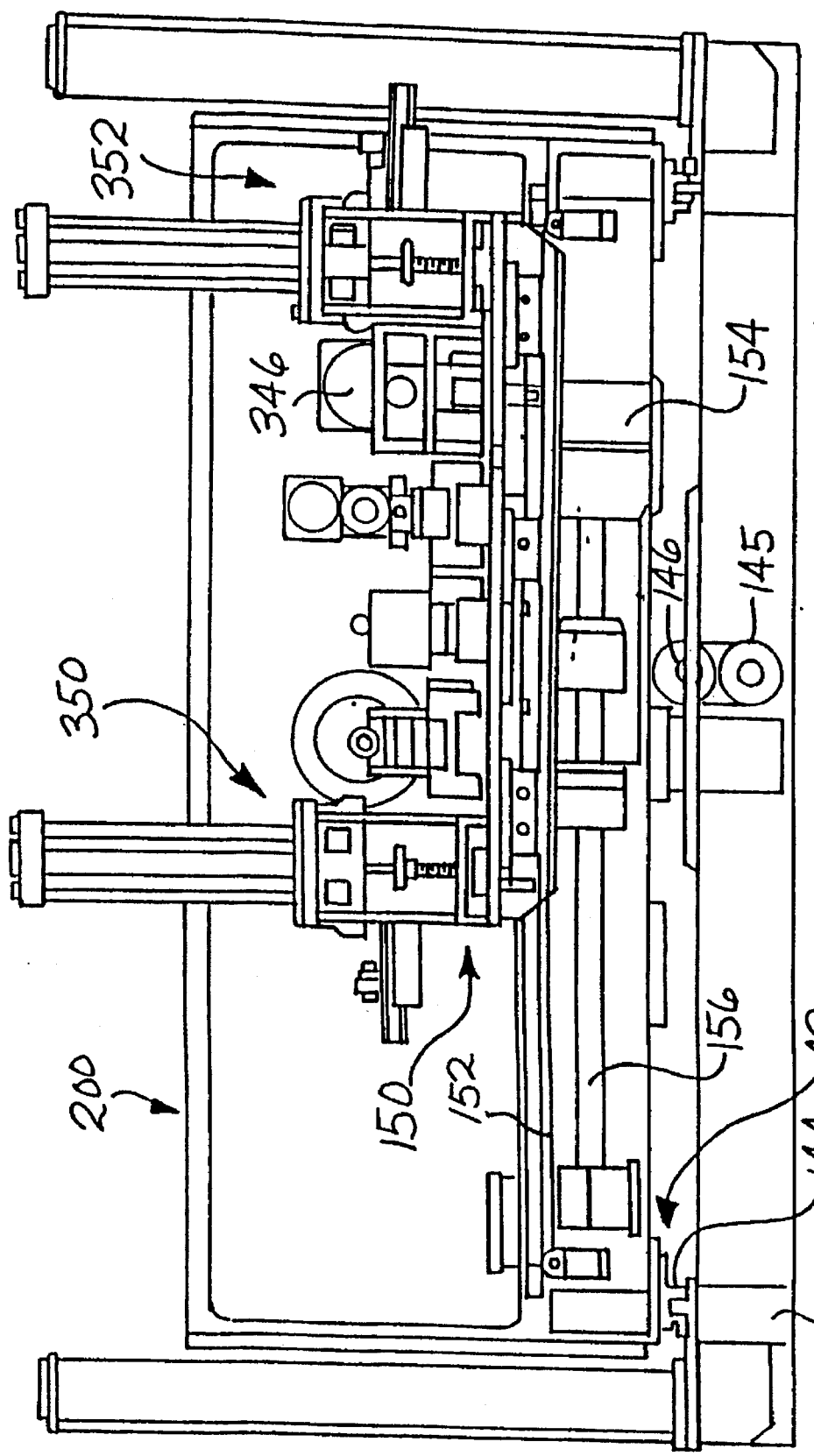
FIG. 16 is an elevation of the tray frame, the tray platform, and the tool tray.

An air cylinder 74, best shown in FIGS. 6 and 9, is connected between the post 68 and the pillar 42 for vertical support of the post on the pillar. The air cylinder 74 has a piston rod 76 connected at its top end to the post 68, and is connected at the bottom end of the cylinder 74 to a bracket mounted on the pillar 42. The air cylinder 74 is pressurized to exactly counterbalance the weight of the post 68 and the clamps to make movement of the post and the clamps easy when the height of the clamps is to be adjusted. The vertical position of the post on the pillar 42 is set by a pin 78 extending through pairs of aligned apertures 80 and 82 in two alignment plates 84 (only one of which is seen in FIG. 9) secured to the post 68 and pillar 42, respectively.

The two different heights provided for the clamps 68 are to enable the right hand spars to be made on the left hand FAJ, and visa-versa. Because of the bend 22 in the spars, it is necessary to make the spars in an inverted orientation when making them on an opposite hand machine, and since they are not symmetrical about the horizontal centerline, it is necessary to reconfigure the clamps to correspond to the inverted dimensions on the spar. When the FAJ 32 is to be reconfigured to make a spar of the opposite hand, it is merely necessary to pull the pin 78 out of the aligned apertures 80 in the aperture plates 84 and move the post on its slide connection to the pillar 42 to the position at which the apertures 82 are aligned, and reinsert the pin 78 through the aligned apertures 82. The configuration change is fast and easy, and it is extremely accurate. It could also be expanded to enable spars for other model airplanes to be made on this FAJ by merely providing other aperture plates drilled appropriately to position the clamps 66 at the correct height for that design of spar.

Once the FAJ 32 is configured to the correct dimensions for the desired spar, the parts which make up the spar must be loaded on the FAJ. First, the carriages are moved to a parking position at the end of the FAJ 32, and then a web 50 is lifted into position onto a series of temporary web index support posts 90. The support posts 90 are provided with index pins that fit into locating holes drilled in the web 50. When the web is presented correctly to the FAJ 32, the pins on the support posts 90 will fit into the holes in the web 50 and the web will be supported at the correct position on the FAJ 32.

The web 50 is loaded onto the FAJ by a parts loading system shown in FIGS. 12 and 13. It includes a series of towers in the form of large brackets 91 slidably mounted on a series of flip doors 92 hinged at pivot points 93 to the inner edge of a scaffold 94 supported on the floor at a position spaced far enough-from the FAJ to permit passage of the carriage 46 along the FAJ 32. The brackets 91 may be pushed on slides 95 on the flip doors 92 toward and away from the workpiece clamp-up position 67 on the FAJ to carry parts for loading onto the FAJ. The flip doors 92 include a hinged support leg 96 which swings down to engage a stop on the scaffold 94 and support the flip doors 92 in their horizontal position. The flip doors 92 provide a bridge from the scaffold 94 to the FAJ 32 for convenient access by workers, and can be rotated upward to provide a clear passage for the carriage 46.

In operation, a crane lifts the web 50 onto a set of stops 97 on clamps 98 which have clamp arms 99 that close on the web 50 and hold it in the clamps 98. The brackets 91 can be pushed on their slides 95 laterally from a web receiving position over to a web loading position adjacent to the FAJ 32, at which position the web is correctly positioned to be pushed onto the index pins 89 of the web index support posts 90. The brackets 91 are then retracted, and two chords 52U and 52L are loaded onto the stops 97 on the clamps 98 which accurately locate the chords 52U and 52L so that they will engage stops on the clamps 66 when the clamp brackets 91 are pushed against the FAJ 32.

When the chords 52 are positioned on the stops on the bracket clamps 98, a sealant is applied to the faying surface of the vertical legs 54U and 54L of the chords 52U and 52L that will contact the web, and the solvent is allowed to flash off from the sealant. The brackets 91 are then slid up against the FAJ to place the chords against the web and in position against locating surfaces on the clamps 66. The clamp arms 99 on the clamps 98 are released one at a time and a jack screw 100 is turned to lift the chord against a horizontal stop 102 on the clamp to ensure that the distance between the outside corners 104U and 104L of each chord, shown in FIG. 5, are the correct distance, since the wing skins 58 and 60 will be fastened directly to these chords. As each jack screw brings the chord into engagement with the clamp stop 102, the clamp is manually actuated to clamp the chord 52 to the clamp 66 at that position. When all the jack screws 100 have been adjusted, all the remaining chord clamps are actuated by a central control (to be described below) to secure the chord rigidly in position on the clamps. Then a series of web-to-chord clamps are actuated to clamp the web to the vertical legs 54U and 54L of the chords 52U and 52L. Some tack rivets can be installed to prevent any slippage of the web on the chords, and the web index support posts 90 can be removed, and the lift door can be lowered to clear the space adjacent the FAJ for travel of the carriage on that side of the FAJ. When the chords are being riveted to the web and other high compression fasteners are being installed, a small amount of longitudinal growth occurs in the structure as a consequence of the compression exerted by the riveting, as is known in the riveting art. To accommodate this growth, an automated routine in the control system releases the clamps 66 serially and then resecures the clamps on the workpiece.

The carriages 46 shown in FIG. 4 and in greater detail in FIGS. 14 and 15, each include a carriage chassis 108 supported vertically by a pair of longitudinally spaced bearing blocks 110 on the rail 44 for rolling motion therealong, and also for lateral motion relative to the rail while traversing the bend 22 (as will be discussed below) and also for rotation about a vertical axis, also while traversing the bend 22. The bearing blocks will be explained in detail in connection With FIGS. 17 and 18. The carriage chassis is driven longitudinally along the rail 44 by a pair of AC servomotors 112 connected by way of a planetary gearbox and timing belt to drive pinions 113 geared to a gear rack 114 on the side of the bottom track 38. The motor/gearbox assemblies are preloaded by hydraulic cylinders for constant anti-backlash mesh of the drive pinions 133 to the rack 114. The servomotors 112 are arranged in a "leader-follower arrangement in which the lead motor drives its pinion in the driving direction and the other motor biases its pinion in the opposite direction to prevent backlash between the pinions and the gear rack 114.

An Inductosyn faran scale 116 is attached to the bottom track in a protected position below the gear rack 114 and under a covered housing. A reader engages the faran scale and slides along with the carriage in contact with the faran scale to provide an accurate feedback signal to the controller as to the longitudinal position of the carriage along the rail 44.

Power and communication lines 120 from a power supply and from the controller are routed through a communication line trough and are strung on a rolling track system 124 in a well know manner. The bottom of the trough is provided with a Teflon plate to facilitate the movement of the rolling track system in the trough 122.

A tray frame 126 is mounted on vertical guides 128 for vertical motion under control of a pair of parallel ball screws 130 driven by a motor 132 through a right angle divider 134 and two horizontal torque tubes 136 to a right angle drive 138 at the head of each ball screw 130. A resolver 140 coupled to each drive screw follows the helical thread on the ball screw 130 for vertical motion of, the tray frame, and a faran scale (not shown) on one of the vertical guides 128, in contact with a reader mounted on the tray frame, gives feedback information to the controller as to the vertical position of the tray frame 126 on the carriage chassis.

A tray platform 142 is mounted on slides 144 on the tray frame 126 for sliding motion toward and away from the workpiece. An AC servomotor 145, with resolver feedback, is mounted on the tray frame 126 and drives a timing belt to operate a ball screw 146 coupled to the tray platform 142. This drive mechanism moves the tray platform toward the wet side of the spar to engage an apertured nosepiece 210, connected to the tray platform 142, with the spar, which interrupts a sensor. Under control of the controller, the drive mechanism moves the wet side nosepiece a small increment further where it servo-locks in a fixed and unyielding position.

An identical AC servomotor arrangement on the dry side carriage moves the dry side nosepiece 210' into initial clamp-up contact with the spar assembly, until interrupted by sensor contact with the spar. Under program control, the drive moves the dry side nosepiece 210 a small increment further, then switches from position control to torque control. At a programmed value corresponding to the required clamping force, the dry side nosepiece 210 is servo locked.

A tool tray 150 is mounted on the tray platform 142 on linear guideways 152 extending on a "U-axis" which is in the direction of the X-axis, parallel to the rail 44. The tool tray is a welded steel structure that moves in the direction of the U-axis to carry various tools and move them longitudinally into axially alignment with the axis of the nosepiece aperture for spar assembly operations. U-axis positioning is independent of positioning on the X, Y, or Z axes.

Movement of the tool tray 150 is by an AC servomotor 154, with resolver feedback, which is mounted on the tray platform 142. Positioning of the tool tray 150, as well as tools on the tool tray and the carriages 46 themselves, is under the control of the system controller, which receives data from a data base in which data sets for parts to be fabricated can be stored, locates where holes are to be drilled and fasteners inserted in the workpiece, and operates to position the carriages, tool trays and tools to drill the holes and install the fasteners at the designated places on the workpiece. The servomotor 154 drives a ball screw assembly 156 to effect controlled longitudinal sliding movement of the tool tray 150 on the tray platform 142. At fixed distance positions along the ball screw, flanged nuts make connections to various fastening system tool assemblies. The features and details of this tool tray motive system are identical on all carriages.

The bearing block 110 shown in FIGS. 17 and 18 includes a bearing base 160 in which are mounted four in-line sets of double rollers 162 for supporting the bearing base 160 on the top surface of the rail 44, and two pairs of opposed vertical axis side rollers 164 engaged with opposite sides of said rail 44. A set of wipers 165 surrounds the outside of the rollers 164 and is in wiping contact with the sides of the rail 44 to prevent debris from getting crushed between the rollers 164 and the rail 44 and damaging the surface thereof.

A bearing lid 166 sits atop the bearing base 160 and is supported thereon by a pair or large diameter thrust and radial bearings 168. The bearing lid is thus able to rotate about a vertical axis on the bearing block as the bearing block travels linearly along the rail. A pair of linear recirculating bearing slides 170 and 170' is mounted on the top of both longitudinally spaced sides on the bearing lid 166. The slides 170 and 170' are engaged with tracks mounted on the underside of the carriage chassis 108 for vertical support of the carriage chassis.

A jacking screw assembly 172 is connected between each bearing lid and the carriage chassis for carriage trimming motion perpendicular to the spar for accommodating the bend in the spar assembly. Trimming maintains the axis of the nosepiece and the tooling normal to the spar under all operating conditions. This function is particularly important during those fastening operations that take place in the region of the spar bend 22. During motion in the vicinity on the bend 22, the carriage is simultaneously pushed and pulled by the jacking screw assemblies 172, and this opposing linear motion results in rotation of the carriage about the Y-axis zero vertical reference sufficient to maintain the nosepiece aperture normal to the spar stack.

An AC servomotor 174 is provided for each bearing block 110, with absolute resolver feedback, to provide rotating output to a ball screw 176 connected in line with the servomotor 174. Each servomotor 174 is connected by a flange 178 on the motor frame to the carriage structure. A cam follower assembly 180 is incorporated in the position of the ball screw nut. The top side of the cam follower is connected to the bearing lid 166 so the two trim assemblies provide offsetting output, and vertical axis rotation.

Figure 24:
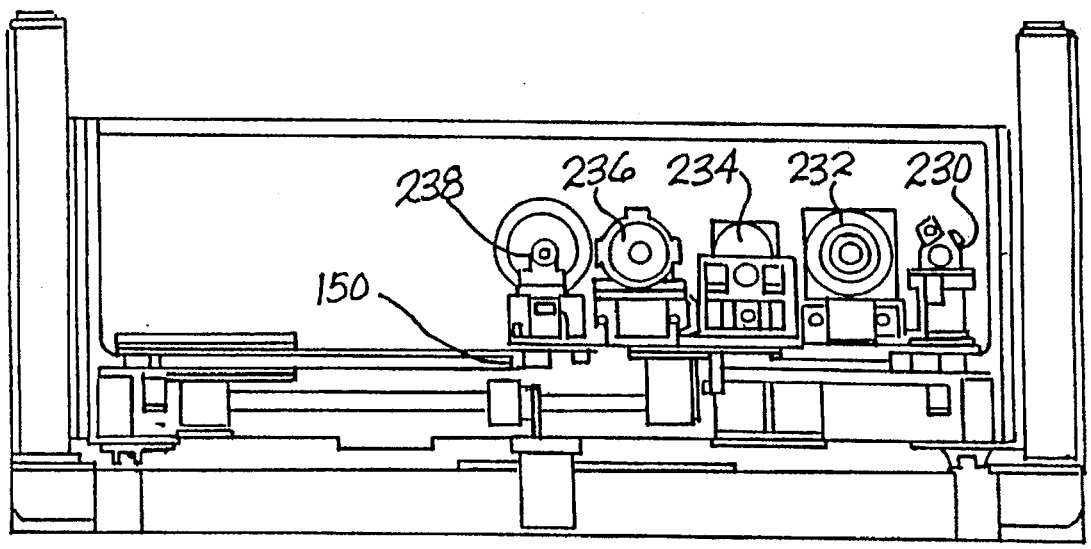
FIG. 24 is a side elevation of the tool tray shown in FIG. 23.
Figure 23:
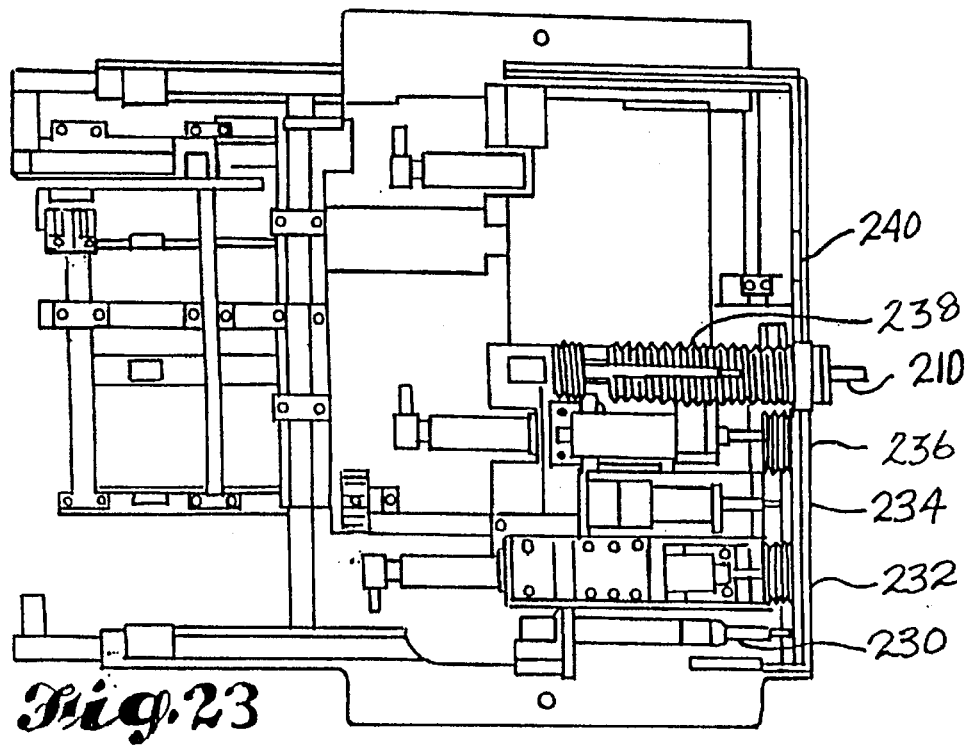
FIG. 23 is a plan view of the dry side tool tray, on opposite side of the workpiece from the tray platform shown in FIG. 22.
Figure 31:
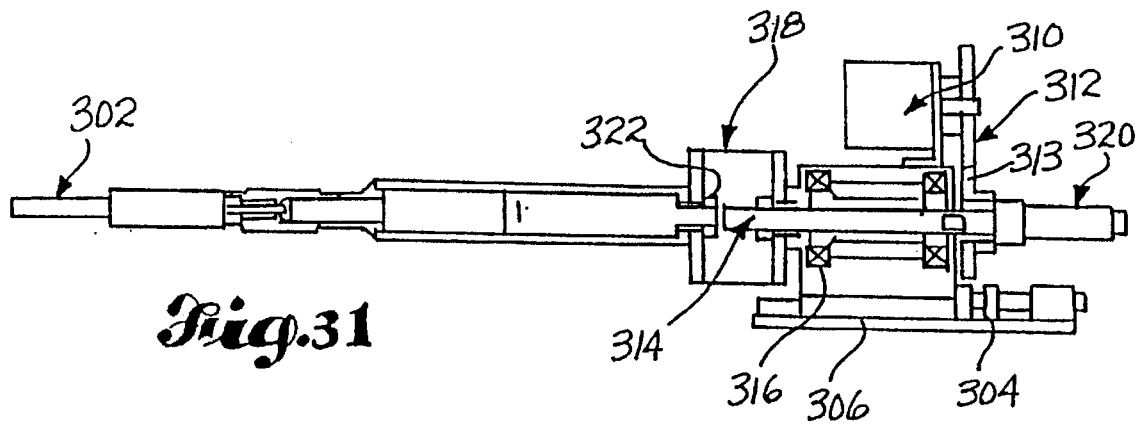
FIG. 31 is an enlarged elevation of the hole checker shown in FIG. 29.

As shown in FIGS. 22–24, the tray platform 142 has a front side facing the workpiece clamp-up position 67. The front side is formed as a strong steel casting known as the "headstone" 200. The headstone extends the full longitudinal length of the tray platform 142 and is slightly curved in a convex shape as seen from the workpiece clamp-up position, as shown in FIG. 22. The headstone provides clamp-up force on the workpiece and the shape, size and material of the headstone allows for powerful clamp-up forces to be exerted by the headstone without significant deflection.

A rotating nose 202 is mounted in the center of the headstone 200 and projects forwardly therefrom toward the workpiece clamp-up position. As shown in FIG. 19, the rotating nose 202 is a cup-shaped member having a cylindrical body 204 open at the back end 206 and with an apertured front end wall 208. A nosepiece 210 is mounted in a stepped aperture in the front end wall 208. The nosepiece has a front end nose 212 that is square in cross-section for maximum compressive strength for a thin walled structure. The nose bears the full compressive clamp-up force and must be able to fit into positions closely adjacent to stiffeners and rib posts on the spar where drilling, riveting and other process steps are to be performed.

The cylindrical body 204 of the rotating nose 202 has an outwardly projecting radial flange 214 to which an annular ring gear 216 is attached. A motor 218 with resolver feedback drives a pinion 220 in meshing engagement with the ring gear 216 to rotate the rotating nose 202. A second motor 222, also with a pinion engaged with the ring gear 216, biases the ring gear in the opposite direction to eliminate any backlash in the gear connection with the ring gear 216. A brake 224 is activated by the control system to automatically grip the ring gear 216 when the rotating nose has been rotated to the desired position so that it does not become accidentally jarred to the wrong angle.

A proximity sensor 226 is attached to the rotating nose 202 at the junction of the nosepiece 212 and the front end wall 208. The proximity sensor 226 detects when the nosepiece makes contact with the workpiece, as will be explained below.

As shown in FIGS. 22–24, a plurality of tools are mounted side-by-side on the tool trays 150 for positioning, in proper order, in line with the axis of the nosepiece 212 by longitudinal movement of the tool tray 15 on its linear guideways 152. The tools on the tool trays 150 on both wet and dry side carriages can be moved into and out of engagement with the workpiece through the bore of the nosepiece 210 after the tray platforms 142 on the wet side and dry side carriages have moved into clamping engagement, without unclamping. In this way, all operations necessary to install a fastener can be performed without unclamping.

The tools on the dry side tool tray 150 include a bolt inserter and driver 230, a drill 232, an electromagnetic riveter 234, a reamer 236, a cold work tool 238 (shown aligned with the nosepiece 210, and a river inserter 240. These tools will be described briefly below.

The drill 232 is a horizontally mounted motor-spindle assembly, totally enclosed and water cooled, powered by a high frequency, AC induction motor. It is mounted on a slide on the tool tray 150 for drill feed by an AC servomotor. The drill is capable of variable speed at constant torque. The drill spindle motor is water cooled utilizing a water cooler mounted on the carriage. The front bearing is equipped with a Promess Thrust Monitor for sensing when the thrust on the bearing exceeds a predetermined magnitude, indicating that the drill is becoming dull. A signal is sent, in such event, by the system controller to a monitor to signal the operator to change the drill bit at the next appropriate opportunity.

The cold work tool is a standard tool provided by Fatigue Technology in Seattle, Wash. Cold working is the process of using mechanical force to expand the diameter of a drilled hole to create a region of residual compressive stress for a distance of up to one-half hole diameter from the hole edge. This process substantially improves the fatigue life of the fastened joint.

A split mandrel is inserted through the drilled hole. The mandrel is expanded and pulled back through the hole with known interference and force. Positioning feed of the cold work system is accomplished with a DC-powered linear actuator. The pull force is developed by means of an air-over-oil hydraulic intensifier piston pump mounted on the carriage with air lines running to the unit. An automatic lubrication applicator system 241 provides lubrication for the split mandrel.

The automatic lubrication system 241 is illustrated in FIGS. 25–28. It includes a base 242 having a cylindrical extension tube 244 secured to an upright support plate 246 which is part of the base. The base is mounted on a slide controlled by a servomotor (not shown), like the other tools on the tool tray 150. A fluid line 248 runs from an adjustable metering valve 250 on the back of a lubricant reservoir 252 to a fitting communicating with an axial passage 254 in the extension tube 244. An air line 256 communicates between an air fitting 258 for connection to a source of air pressure, to a pressure regulator and gauge 260 and thence to the air space over the lubricant reservoir to pressurize the reservoir.

A lubricant applicator 261, shown in FIGS. 27 and 28, is mounted on the front end of the extension tube 244. The applicator includes a cylindrical body 262 and a sleeve 264. The body 262 is bolted to the end of the extension tube and has an axial passage 266 in communication with the axial passage 254 in the extension tube 244. The passage 266 opens to the external surface of the body 262 between two grooves 268 and 270, each having a sealing O-ring. A second section 266' of the axial passage 266 communicates between the end 272 of the body 262 and the external surface of the body between the groove 270 and an adjacent groove 274, also holding a sealing O-ring.

A groove 276 in the inside surface of the sleeve permits fluid to flow around the middle sealing O-ring in the groove 270 when the sleeve 264 is moved against the biasing force of a compression spring 278 coiled between a shoulder 280 and the back end 282 of the sleeve 264. This movement occurs when the tip 284 of the applicator is inserted into a hole 285 and the front shoulder 286 of the sleeve 264 engages the workpiece 288. Continued forward movement of the base 242 along its slide, driven by its servomotor, pushes the body 262 into the sleeve an actuating distance "X", thereby permitting flow of lubricant through the axial passages 266 and 266', through a check valve 290, and into a perforated axial tube 292 in the tip 284, and out into a sleeve 294 of porous wicking material such as felt. The lubricant is uniformly distributed as shown in FIG. 28 through the wicking sleeve, and the amount of lubricant is controlled by the dwell time of the applicator in the position shown in FIG. 28. The applicator is retracted automatically after the preset dwell time, thereby automatically shutting off the flow of lubricant to the tip 284.

Figure 30:
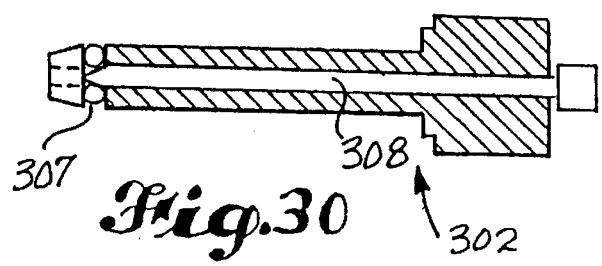
FIG. 30 is an even more greatly enlarged sectional elevation of the hole checker probe shown in FIG. 29.
Figure 29A:
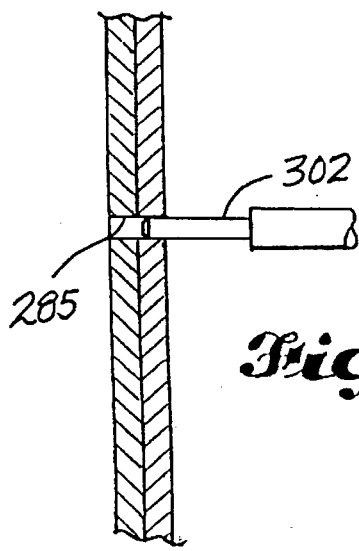
FIG. 29A is an enlarged elevation of the probe of the hole checker shown in FIG. 29.
Figure 29:
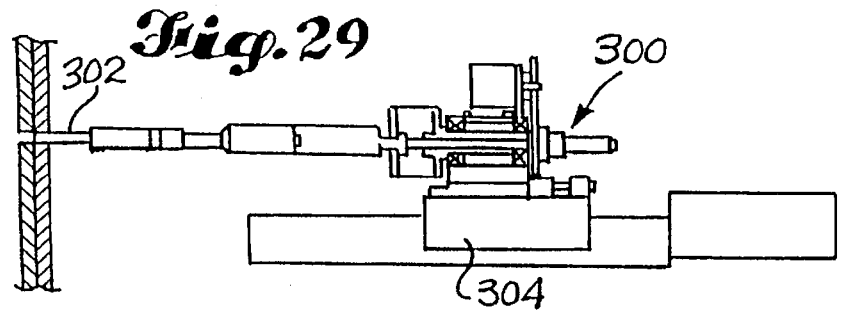
FIG. 29 is an end elevation of the hole checker mounted on the wet side tool tray shown in FIG. 22.
Figure 32:
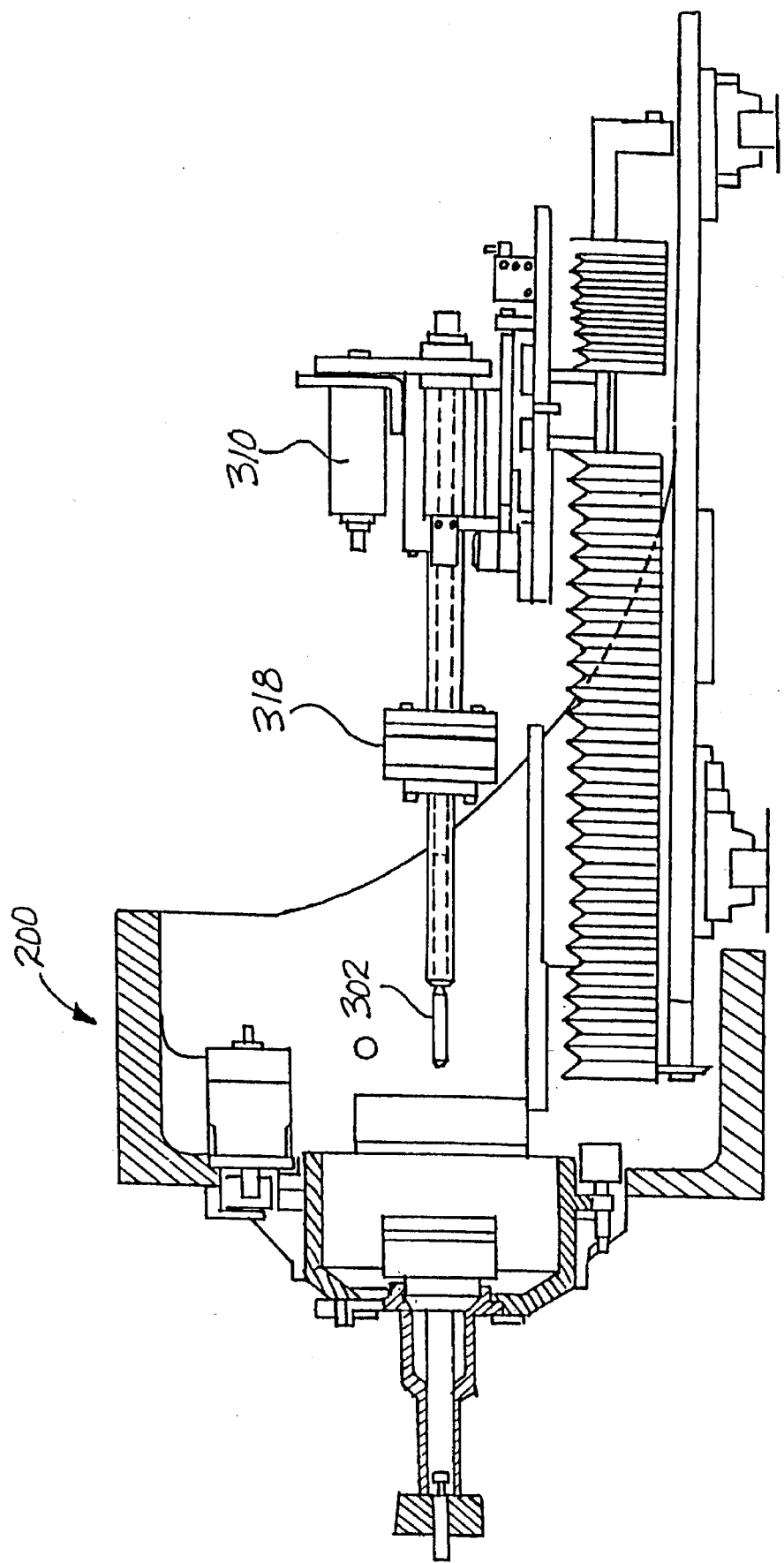
FIG. 32 is an elevation, partly in section, showing the hole checker mounted on the wet side tool tray in both extended and retracted positions.

After a hole 285 has been drilled, cold worked, and reamed, a hole checker 300, shown in FIG. 29, is indexed to the hole and a probe 302 is inserted into the hole by actuation a linear positioning device 304 to advance the hole checker on its slide 306 on the tool tray 150. The probe 302, shown enlarged in FIG. 30, is a stylus-type device slightly larger than the nominal hole diameter and having two opposing spring-loaded ball contacts 307. Contact with the wall of the hole 285 causes the balls to displace inward toward the stylus center, wedging and displacing the conical-shaped core 308 of a differential transformer. The wedging action is translated into linear displacement. The core 308 is both the main interior element of the stylus and also the core 308 of a linear variable differential transformer (LVDT) 308. Linear displacement of the core 308 produces an AC voltage output proportional to the displacement of the transformer core relative to its windings. A spring (not shown) on the core axis anchors it to the stylus shell, ensuring displacement only when measuring diameters less than the distance between the ball contacts.

The probe takes two measurements at each of two hole depths, and sends analog signals that can be processed to determine if the hole characteristics are within allowance for riveting or bolting. Probe rotation for measurement is accomplished with a pneumatic rotary actuator main shaft 314 which is supported for rotation on bearings 316. A remote centering compliance device 318 permits the probe 302 to move parallel to itself to self-center in the hole.

The remote centering compliance device 318 may permit the probe 302 to sag slightly, so a centerlocking actuator 320 can be energized to advance the shaft 314 into a receptacle 322 in the front end of the remote centering compliance device 318 to lock it up in a rigid axially aligned configuration to ensure the probe tip remains on axis. Once the tip is in the hole, the actuator 320 can withdraw the shaft 314 so the probe can move parallel to itself to lie exactly parallel to the hole axis to ensure an accurate measurement.

After the hole is checked in two or more planes through the axis of the hole, a fastener may be fed to the hole. An electro-pneumatic fastener feed system supplies bolts and rivets from trays on the dry side carriages, and nuts and collars from magazines from the wet side carriages. Fastener trays and magazines are preloaded with high compression type fasteners, such as bolts and rivets, and are delivered loaded to the carriage. Fasteners are selected from the trays (bolts and rivets) or magazines (nuts and collars) under program control and pneumatically fed to insertion positions unique to each tool. Sensors verify fastener type and position in the tooling prior to initiating the fastening sequence. Fasteners differ in size (diameter and length) and type (bolts, rivets, nuts, collars).

Figure 33:
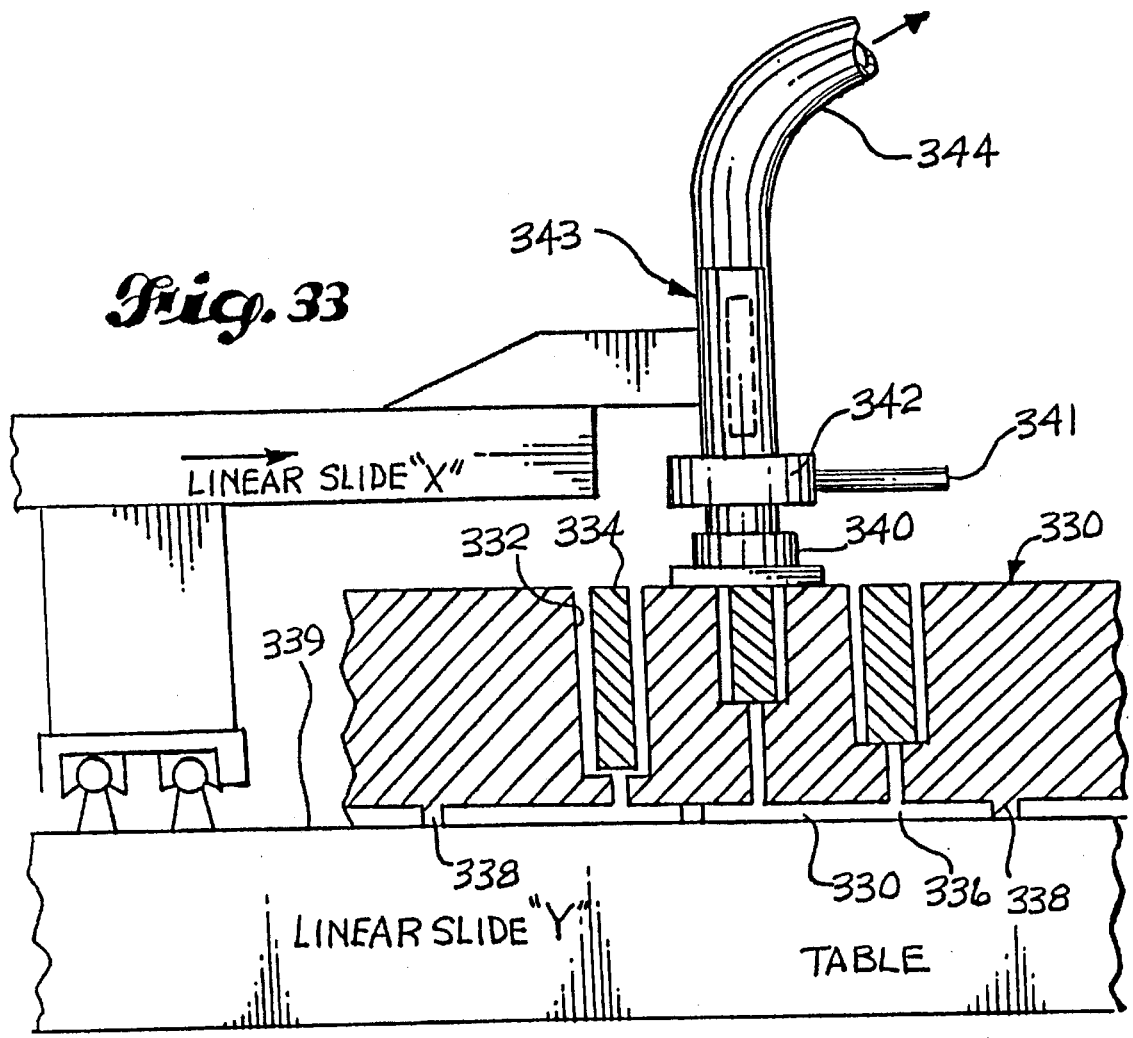
FIG. 33 is a sectional elevation of a fastener feed system for feeding fasteners to the fastener inserters on the dry side tool tray.
Figure 34:
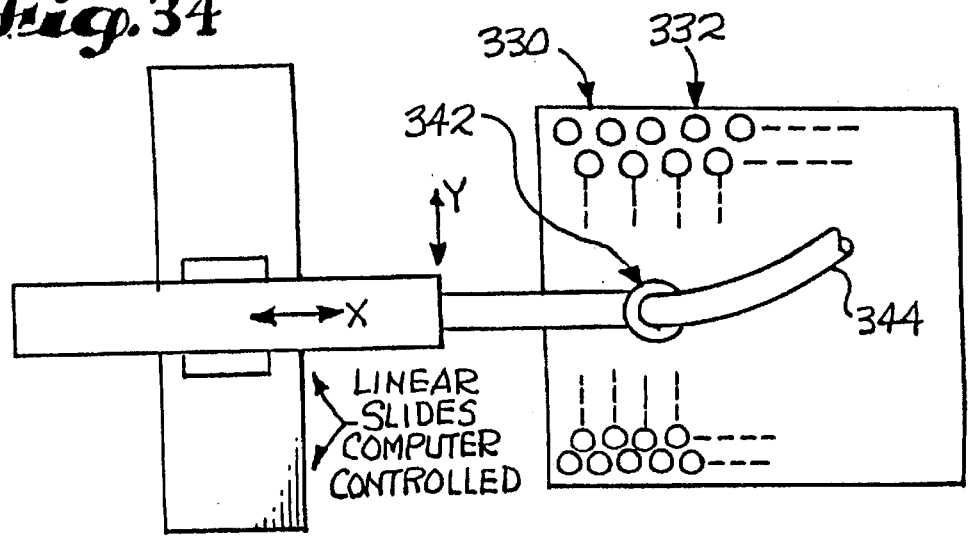
FIG. 34 is a plan view of the fasterer feed system shown in FIG. 33.
Figure 36:
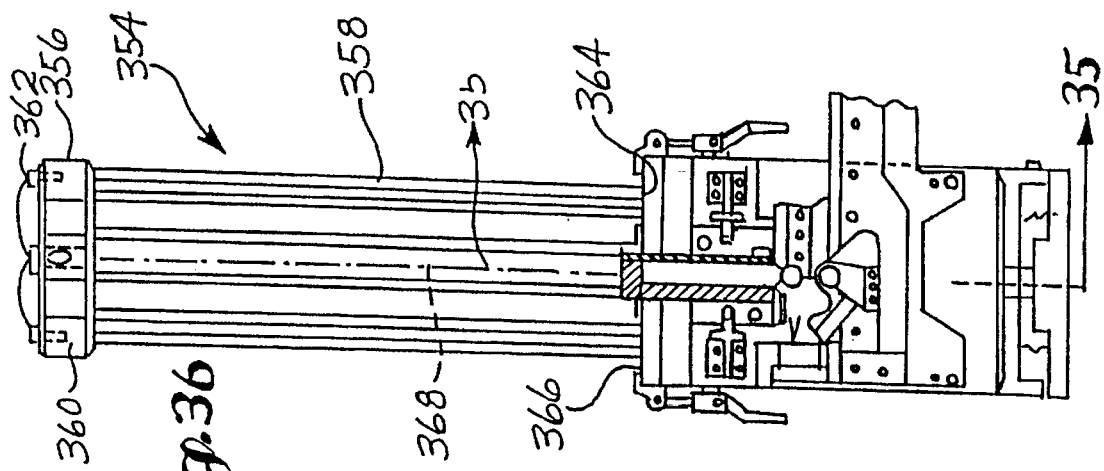
FIG. 36 is a side elevation of the nut feed device shown in FIG. 35.
Figure 35:
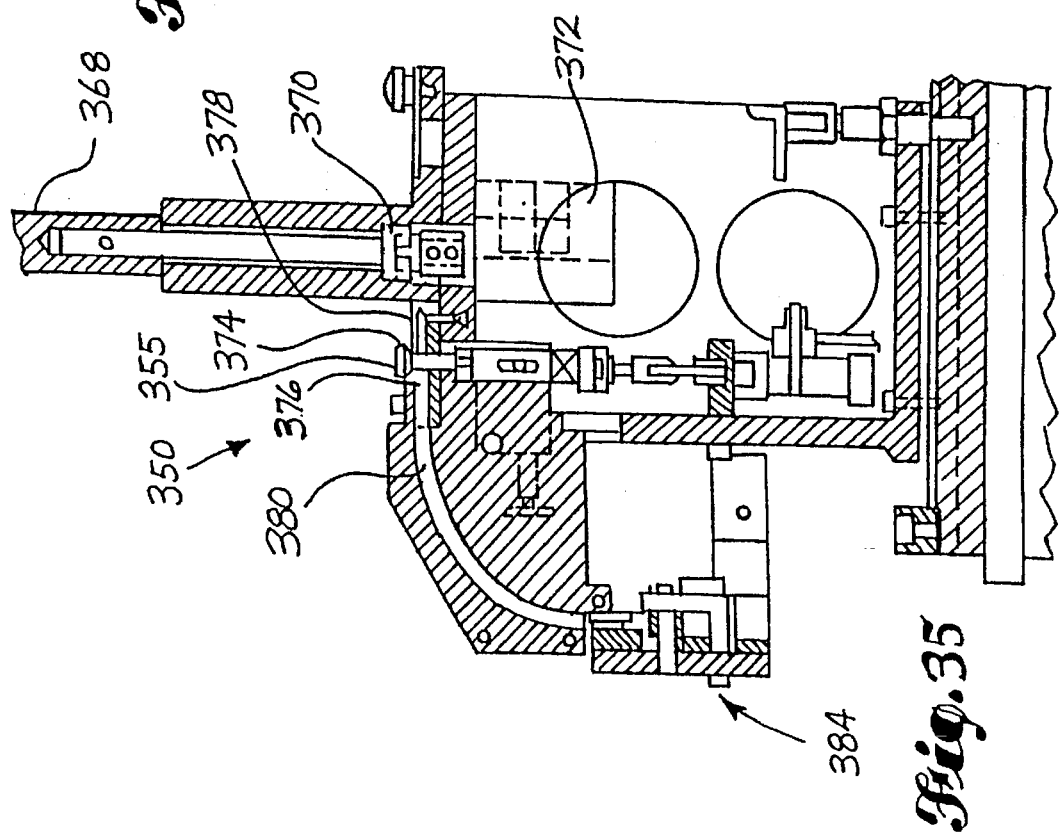
FIG. 35 is an elevation of a nut feed device mounted on the wet side tool tray shown in FIG. 22.

An element of the fastener feed system is shown in FIGS. 33 and 34. It includes a nylon tray 330 in which holes 332 have been drilled. Fasteners 334 are stored individually in the holes 332. The depth of the holes 332 was preselected to correspond to the length of the fastener 334 so all the fasteners are flush with the top surface of the tray 330. This helps ensure that any mistakes in loading the trays will be easily detected because the fastener thickness and length will not match the hole diameter and depth.

A small bleed hole 336 is drilled through the bottom of each hole 332 communicating with the bottom of the tray 330. A plurality of small feet 338 hold the tray off the surface 339 on which it sits to permit air to flow through the bleed holes 336 when fasteners 334 are sucked out of the holes 332.

An X–Y positioning system is provided for positioning a suction head 340 over the holes 332. The X–Y positioning system is commercially available and is similar to the standard plotter. It is commonly used for moving lasers over a surface to be scanned or illuminated in a particular pattern. A vertical translator 342 lifts the suction head off of the tray 330 when the tray is to be replaced, but is not necessary to lift the suction head 340 when moving over the top of the tray 330 since the friction is small. When the X–Y positioner has moved the suction head to the correct position as verified by feedback sensors in the positioning system, the suction is turned on by blowing air, delivered through an air supply line 341, through a Vaccon tube 342 which generates suction by air velocity, thereby sucking a fastener out of the hole 332 and propelling it through a delivery tube 344.

The fastener is propelled through the delivery tube 344 and delivered to a fastener insertion device 230, shown in FIGS. 23 and 24. The insertion device 230 slides forward on its slide and pokes the fastener into the hole. The threaded portion of the fastener is a slightly smaller diameter than the shank portion, and the threaded portion enters the hole, but the shank portion is slightly larger than the hole and must be forced into the hole. A pneumatic seating hammer behind the fastener insertion device 230 can be used to seat the fastener, or the electromagnetic riveter can be used.

The electromagnetic riveter 346 has an electromagnetic actuator, including a coil, a transducer and a driver. The driver is axially aligned with the fastener by moving the tray 150 longitudinally, as described previously, so that when the coil is electrically energized, the transducer is forcably repelled away from the coil and the driver is propelled against the fastener head to seat the fastener head against the workpiece surface. A lateral slide on which the electromagnetic actuator is mounted for sliding motion toward and away from the workpiece position is actuated to position the driver against the fastener head, and a sensor determines the lateral position of the driver relative to the workpiece surface. The controller now knows how far the fastener must be driven to seat the fastener head against the workpiece. By tests, the force to seat the fastener head against the workpiece, without excessive impact between the fastener head and the workpiece as to cause damage, at incremental distances from the workpiece has been determined, and those values have been entered in a look-up table in the controller. The controller matches the distance of the fastener head from the workpiece with the corresponding value in the look-up table to determine how hard the fastener must be hit by the driver. By tests, it has been determined how far away from the fastener head the driver must be to deliver a certain force. The controller communicates with the motive device for moving the electromagnetic riveter and the sensor to move the electromagnetic actuator away from the fastener to its home position, and then back toward the fastener. When the driver reaches the predetermined position, the controller triggers the power supply of the riveter to fire and propel the driver forward against the fastener to seat the fastener against the workpiece surface.

A nut feeding device 350 and a collar feeding device 352 are provided on the wet side carriage tool tray 150'. Both devices are virtually identical, so the nut feeding device will be described. A carrousel 354 is provide atop the device 350 for carrying a multiplicity of nuts 355. The carrousel 354 has a rotating head 356 from which depend a plurality of rods 358 and onto which can be slid a multiplicity of nuts. The rods each have an upper end 360 fixed in the rotating head 356 by screws 362. The rods each have a free lower end 364 space closely adjacent a sliding surface 366.

The rotating head 356 is rotated by a shaft 368 projecting on an axis of rotation from the rotating head and coupled by way of a quick release coupling 370 to an indexing drive mechanism 372 for rotating the shaft 368 to rotate and drive the carrousel about its axis of rotation. An opening 374 in the sliding surface 366 at one radial position on the circular path around which the nuts travel as the carrousel rotates allows the nuts to drop one at a time into a feed slot 376 where they are blown by and air jet 378 into a channel 380. The nut channel 380 curves downwardly for conveying the nut to a nut loading station 384. A nut transfer arm 386 carries the nut laterally to the adjacent nut runner and holds the nut in front of the nut runner 390, shown in FIG. 37, while the socket 392 on the nut runner engages the nut. The nut then slides into the socket and the transfer arm retracts to allow the nut runner to advance forward and present the rotating nut to the bolt.

Obviously, numerous modifications and variations of the described preferred embodiment are possible and will occur to those of ordinary skill in the art in view of this disclosure. Accordingly, it is expressly to be understood that these other embodiments, and their equivalents, may be practiced while remaining within the spirit and scope of the invention as defined in the following claims, wherein

We claim:

1. An automated assembly machine for fabricating large mechanical structures from a multiplicity of individual parts, comprising:

a floor assembly jig having a multiplicity of clamps for receiving and holding said parts in a desired orientation with respect to each other and in a desired position in space, clamped together in a workpiece clamp-up position, having supports and guides for supporting and guiding a pair of carriages along the length of said machine on opposite sides of said workpiece clamp-up position;

a pair of carriages supported and guided on supports and guides on said floor assembly jig, said carriages being disposed on opposite sides of said workpiece clamp-up position;

a first drive mechanism for independently driving said carriages longitudinally along said guides and supports;

a second drive mechanism for moving said carriages vertically with respect to said floor assembly jig;

a tool tray mounted on at least one of said carriages, said tool tray being mounted on a shifting mechanism for longitudinal movement on said at least one carriage relative to said floor assembly jig;

a plurality of tools, including a drill, a hole diameter measurement probe, a nut runner, and an electromagnetic riveter, mounted on slides on said tool tray for lateral movement toward and away from said workpiece clamp-up position;

a motive device for moving each of said tools toward and away from said workpiece clamp-up position;

whereby said tools can be positioned at any desired position on said workpiece clamp-up position by moving said at least one carriage longitudinally along said floor assembly jig to a desired longitudinal position, and raising said at least one carriage to elevate said tool tray to a desired elevation, shifting said tool longitudinally along said at least one carriage to align one of said tools with the desired position, and sliding the one of said tools laterally into said workpiece clamp-up position.

2. An automated assembly machine as defined in claim 1, further comprising:

a nose on a side of said tool tray adjacent said workpiece clamp-up position, and a translating mechanism for moving said nose into said workpiece clamp-up position to engage a workpiece supported therein to clamp said workpiece while said tools perform their functions.

3. An automated assembly machine as defined in claim 1, further comprising a computer control system for controlling the movement of said carriages, tool tray, and tools, said computer control system including:

a data base in which data sets for parts to be fabricated can be stored;

a system controller for positioning said carriages, and tool tray and said tools to locate where holes are to be drilled and fasteners inserted in said workpiece.

4. An automated assembly machine as defined in claim 3, further comprising:

an automated routine in said control system for releasing said clamps serially and then resecuring said clamps on said workpiece to accommodate growth of the length of said workpiece as high compression fasteners are installed in said workpiece.

5. An automated assembly machine for fabricating large mechanical structures, as defined in claim 1, further comprising a fastener feed system for selecting a fastener needed for a particular fastening location from a fastener storage area and delivering the fastener to a workpiece where the fastener is to be installed, said fastener feed system including:

a tray mounted on one of said carriages and having a floor and a grid partition arrangement defining a multiplicity of vertically elongated, upwardly opening cells for holding single fasteners in a vertical orientation;

a delivery tube for conveying fasteners, selected and extracted from said tray, to a device for inserting fasteners into the workpiece;

a suction head attached to said proximal end of said delivery tube for contacting a top edge of said grid partition arrangement and applying suction to a selected cell to suck the fastener in said cell through said suction head and into said delivery tube;

a motive device for positioning said suction head over said selected cell; and a control system for controlling said motive device.

6. An automated assembly machine for fabricating large mechanical structures, as defined in claim 5, wherein:

said tray is a block of material into which cell holes have been drilled to form said cells, said grid partition arrangement comprising the material of said block between said cell holes.

7. An automated assembly machine for fabricating large mechanical structures, as defined in claim 6, further comprising:

an air hole in the bottom of each cell hole and communicating with the bottom surface of said tray;

whereby air can flow from below said tray up through said air hole and through said cell when said suction head sucks said fastener out of said cell.

8. An automated assembly machine for fabricating large mechanical structures, as defined in claim 7, further comprising:

a plurality of feet on said bottom surface of said tray to provide an air space between said bottom surface and the surface on which said tray sits;

whereby air can flow into said air holes when said suction head sucks said fastener out of said cell.

9. An automated assembly machine for fabricating large mechanical structures, as defined in claim 6, wherein:

said cell holes are each drilled to a depth equal to the length of the fastener that is to be placed in the cell hole, whereby the tops of all of said fasteners in said tray, when said tray is fully loaded, lie substantially flush with the top surface of said partitions.

10. An automated assembly machine for fabricating large mechanical structures, as defined in claim 5, wherein:

said motive device includes a gantry mounted on two slides, one each on each of two opposite sides of a tray holder, for movement in an "X" direction, and a slider mounted on said gantry for carrying said suction head in a "Y" direction orthogonal to said "X" direction.

11. An automated assembly machine for fabricating large mechanical structures, as defined in claim 5, wherein said control system comprises:

a machine readable code on said tray for identifying each individual tray;

a reader adjacent to a holder for said trays for reading said code;

a computer having a look-up table in which the location of each fastener size in each tray is stored; and a communication network for communicating to said computer the identification of each tray as read by said reader, and for communicating from said computer to said motive device instructions as to the location of the next fastener to be selected from said tray for insertion into said workpiece.

12. A method of automatically fabricating large mechanical structures from a multiplicity of individual parts, comprising:

receiving and holding said parts in a desired orientation with respect to each other;

clamping said parts together in a workpiece clamp-up position in their relative position with respect to each other which said parts will occupy in said large mechanical structure;

supporting and guiding a pair of carriages along opposite sides of said workpiece clamp-up position;

independently driving said carriages longitudinally and vertically with respect to said workpiece clamp-up position;

supporting a tool tray on a shifting mechanism on at least one of said carriages for longitudinal movement on said at least one carriage relative to said workpiece clamp-up position; and individually mounting a plurality of tools, including a drill, a hole diameter measurement probe, a bolt inserter, a cold working tool, and an electromagnetic riveter on slides on said tool tray for movement laterally toward and away from said workpiece clamp-up position and performing drilling and fastening operations on said parts to fasten said parts together to make said large mechanical structure.

13. A method of automatically fabricating large mechanical structures as defined in claim 12, further comprising feeding fasteners to a fastener installation device on said tool tray for installation of said fasteners into holes in a workpiece, said fastener feeding step including:

storing said fasteners in upwardly opening individual cells defined by cell walls in trays located in proximity to said installation device;

moving a suction head over an individual cell containing a fastener to be installed in said workpiece and into contact with the top surface of said cell walls to seal said suction head to said cell walls to minimize short-circuiting of air around said cell and into said suction head;

sucking said fastener out of said cell and through a delivery tube to said installation device.

14. A method as defined in claim 13, wherein said moving step includes:

identifying said tray;

looking up in a computer, in a look-up table associated with said tray, the location of the next fastener to be delivered to said installation device;

communicating to a motive device the location of said next fastener in said tray; and operating said motive device to carry said suction head to said location of said next fastener in said tray.

15. A method as defined in claim 14, wherein said identifying step includes:

reading a machine readable code on said tray and communicating said code to said computer.

16. A method as defined in claim 14, wherein said operating step includes:

sliding a gantry spanning said tray over said tray to a position along one edge of said tray corresponding to the position of the cell holding said next fastener; and sliding a carrier holding said suction head along said gantry to a position along another edge of said tray, orthogonal to said one edge, to position said suction head exactly over said cell holding said next fastener.

17. A method as defined in claim 14, wherein said identifying step includes:

scanning a machine readable code on said tray to discern the identity of that configuration of tray; and communicating to said computer the identity of said tray to enable said computer to find said associated look-up table.

18. A method as defined in claim 13, wherein said suction head moving step includes:

moving a gantry over said open ends of said cells in said tray to position said gantry over said tray at a desired distance from one edge of said tray;

sliding a carrier on which said suction head is mounted lengthwise along said gantry to position said suction head at a desired distance from an orthogonal edge of said tray and over a desired cell.

19. A method as defined in claim 18, further comprising:

extending said suction head downward into contact with said tray and applying suction to said suction head to effect said suction step.

20. A method of automatically fabricating large mechanical structures from a multiplicity of individual parts, comprising:

receiving and holding said parts in a desired orientation with respect to each other;

clamping said parts together in a workpiece clamp-up position in their relative position with respect to each other which said parts will occupy in said large mechanical structure;

supporting and guiding a pair of carriages along opposite sides of said workpiece clamp-up position;

supporting a tool tray on a shifting mechanism on at least one of said carriages for longitudinal movement on said at least one carriage relative to said workpiece clamp-up position;

individually moving a plurality of tools, including a drill, and a fastener insertion device, on slides on said tool tray laterally toward and away from said workpiece clamp-up position to perform operations on said parts to fasten said parts together to make said large mechanical structure;

drilling a hole in said workpiece with said drill;

feeding a fastener to said fastener insertion device;

inserting a distal end of said fastener, opposite a headed end thereof, into said hole so that said distal end is tightly wedged into said hole and said headed end of said fastener is spaced from said workpiece surface;

extending a driver of an impulse actuator into contact with said fastener head; and actuating said impulse actuator to seat said fastener against said workpiece surface.

21. A method of automatically fabricating large mechanical structures as defined in claim 20, further comprising:

sensing and recording the position of said driver when it is in contact with said fastener head to determine how far said fastener must be driven into said hole to seat said fastener head against said workpiece surface;

actuating said impulse actuator to produce sufficient energy to drive said fastener into said hole to seat said fastener head against said workpiece, but with less energy than would cause said fastener head to damage said workpiece.

22. A method of seating a fastener as defined in claim 21, wherein:

said sensing step includes moving a slider of an LVDT, operatively connected to said driver, with said driver and measuring the voltage of the signal from said LVDT to ascertain the position of said driver.

23. An automated assembly machine for fabricating large mechanical structures from a plurality of components, comprising:

a floor assembly jig for supporting said components of said structure in correct position relative to one another while said structure is being fastened together;

at least one pair of carriages supported on said floor assembly jig for carrying tools for fastening said structure together;

a tool tray mounted on at least one of said carriages, said tool tray being mounted on a shifting mechanism for longitudinal movement on said at least one carriage relative to said floor assembly jig;

a plurality of tools, including a drill, a rivet inserter, and an electromagnetic riveter, mounted on slides on said tool tray for lateral movement toward and away from said workpiece clamp-up position;

a fastener feed system for selecting a fastener needed for a particular fastening location from a fastener storage area on at least one of said carriages, and for delivering the fastener to said rivet inserter for installation of a rivet in a hole drilled by said drill, said fastener feed system including:

a tray having a multiplicity of vertically elongated, upwardly opening cells for holding single fasteners in a vertical orientation;

a delivery tube for conveying fasteners, selected and extracted from said tray, to a device for inserting fasteners into the workpiece;

a suction head attached to said delivery tube for applying suction to a selected cell to suck the fastener in said cell through said suction head and into said delivery tube;

a motive device for positioning said suction head over said selected cell; and a control system for controlling said motive device.

24. An automatic fastening system for assembling large mechanical structures, comprising:

a floor assembly jig for supporting said components of said structure in correct position relative to one another while said structure is being fastened together;

a pair of carriages supported on said floor assembly jig for carrying tools for fastening said structure together;

a fastener feed system for selecting a fastener needed for a particular fastening location from a fastener storage area on at least one of said carriages and delivering the fastener to a workpiece where the fastener is to be installed, said fastener feed system including:

a tray having a multiplicity of vertically elongated, upwardly opening cells for holding single fasteners in a vertical orientation;

a delivery tube for conveying fasteners, selected and extracted from said tray, to a device for inserting fasteners into the workpiece;

a suction head attached to said delivery tube for applying suction to a selected cell to suck the fastener in said cell through said suction head and into said delivery tube;

a motive device for positioning said suction head over said selected cell; and a control system for controlling said motive device.

\* \* \* \* \*